US009552478B2

(12) United States Patent
Sobko et al.

(10) Patent No.: US 9,552,478 B2
(45) Date of Patent: Jan. 24, 2017

(54) TEAM SECURITY FOR PORTABLE INFORMATION DEVICES

(75) Inventors: Andrey V. Sobko, Moscow (RU); Anton V. Tikhomirov, Moscow (RU); Nadezhda V. Kashchenko, Moscow (RU); Dmitry A. Polyakov, Moscow (RU); Magnus Kalkuhl, Ingolstadt (DE)

(73) Assignee: AO KASPERSKY LAB, Moscow (RU)

(*) Notice: Subject to any disclaimer, the term of this patent is extended or adjusted under 35 U.S.C. 154(b) by 1018 days.

(21) Appl. No.: 12/833,325

(22) Filed: Jul. 9, 2010

(65) Prior Publication Data

US 2011/0289308 A1    Nov. 24, 2011

(30) Foreign Application Priority Data

May 18, 2010    (RU) .................. 2010119567

(51) Int. Cl.
*H04L 29/06* (2006.01)
*G06F 21/56* (2013.01)
*G06F 21/55* (2013.01)

(52) U.S. Cl.
CPC ............. *G06F 21/56* (2013.01); *G06F 21/55* (2013.01)

(58) Field of Classification Search
USPC ........................................................ 726/16
See application file for complete search history.

(56) References Cited

U.S. PATENT DOCUMENTS

| 4,964,077 A | 10/1990 | Eisen et al. |
| 5,388,198 A | 2/1995 | Layman et al. |
| 5,496,177 A | 3/1996 | Collia et al. |
| 5,522,070 A | 5/1996 | Sumimoto |
| 6,611,925 B1 | 8/2003 | Spear |
| 6,629,143 B1 | 9/2003 | Pang |
| 6,650,322 B2 | 11/2003 | Dai et al. |
| 6,728,886 B1 * | 4/2004 | Ji ........................ G06F 21/566 714/26 |
| 6,785,822 B1 | 8/2004 | Sadhwani-Tully |

(Continued)

FOREIGN PATENT DOCUMENTS

| EP | 2180444 | 4/2010 |
| EP | 2388727 | 11/2011 |

(Continued)

OTHER PUBLICATIONS

Webopedia.com definition of "ad-hoc" Oct. 1, 2002.*

(Continued)

*Primary Examiner* — Harris C Wang
(74) *Attorney, Agent, or Firm* — Patterson Thuente Pedersen PA

(57) ABSTRACT

A portable information device (PID) having a security module that conducts security-related functionality. At least some of the security-related functionality for the benefit of the PID is provided by a security team of at least one other PID. In one type of arrangement, when configured in a team processing mode, certain ones of the security functions or components operating for the benefit of the PID can be processed on one or more of the security team member devices. In another type of arrangement, the team of devices exchanges security-related information determined as a result of a single team member device's processing of one or more security-related tasks.

17 Claims, 31 Drawing Sheets

(56) References Cited

U.S. PATENT DOCUMENTS

| | | | |
|---|---|---|---|
| 6,842,681 B2 | 1/2005 | Imai et al. | |
| 6,978,308 B2 | 12/2005 | Boden et al. | |
| 6,996,845 B1 | 2/2006 | Hurst et al. | |
| 7,076,650 B1 | 7/2006 | Sonnenberg | |
| 7,107,618 B1 | 9/2006 | Gordon et al. | |
| 7,124,438 B2 | 10/2006 | Judge et al. | |
| 7,146,155 B2 | 12/2006 | Kouznetsov | |
| 7,152,172 B2 | 12/2006 | Tsirkel et al. | |
| 7,174,566 B2 | 2/2007 | Yadav | |
| 7,237,080 B2 | 6/2007 | Green et al. | |
| 7,243,373 B2 | 7/2007 | Muttik et al. | |
| 7,257,630 B2 | 8/2007 | Cole et al. | |
| 7,308,493 B2* | 12/2007 | Liang | H04L 41/0213 709/223 |
| 7,308,703 B2 | 12/2007 | Wright et al. | |
| 7,310,817 B2 | 12/2007 | Hinchliffe et al. | |
| 7,353,533 B2 | 4/2008 | Wright et al. | |
| 7,389,358 B1 | 6/2008 | Matthews | |
| 7,440,996 B2 | 10/2008 | Gebhart | |
| 7,444,398 B1 | 10/2008 | Matthews | |
| 7,478,420 B2 | 1/2009 | Wright et al. | |
| 7,487,348 B2 | 2/2009 | Kroening | |
| 7,526,800 B2 | 4/2009 | Wright et al. | |
| 7,536,471 B2* | 5/2009 | Oliver et al. | 709/232 |
| 7,543,056 B2 | 6/2009 | McClure et al. | |
| 7,555,621 B1 | 6/2009 | Pavlyushchik | |
| 7,584,508 B1* | 9/2009 | Kashchenko | H04L 63/105 726/25 |
| 7,607,174 B1* | 10/2009 | Kashchenko | G06F 21/74 726/23 |
| 7,636,764 B1 | 12/2009 | Fein et al. | |
| 7,657,493 B2 | 2/2010 | Meijer et al. | |
| 7,770,114 B2 | 8/2010 | Sriprakash et al. | |
| 7,818,814 B2 | 10/2010 | Lu et al. | |
| 7,849,497 B1 | 12/2010 | Hurst et al. | |
| 7,891,001 B1 | 2/2011 | Greenawalt et al. | |
| 7,962,914 B2 | 6/2011 | Caccavale | |
| 7,979,515 B2 | 7/2011 | Morikawa | |
| 8,010,703 B2 | 8/2011 | Hubbard et al. | |
| 8,037,527 B2 | 10/2011 | Milener et al. | |
| 8,060,939 B2 | 11/2011 | Lynn et al. | |
| 8,131,846 B1 | 3/2012 | Hernacki et al. | |
| 8,340,658 B2* | 12/2012 | Tsui | H02J 7/0055 455/352 |
| 2001/0052008 A1 | 12/2001 | Jacobus | |
| 2002/0004814 A1 | 1/2002 | Tanaka | |
| 2002/0129111 A1 | 9/2002 | Cooper | |
| 2003/0074387 A1* | 4/2003 | Tanaka | 709/103 |
| 2003/0120502 A1 | 6/2003 | Robb et al. | |
| 2003/0221122 A1 | 11/2003 | Hatori | |
| 2004/0098447 A1* | 5/2004 | Verbeke | G06F 9/5055 709/201 |
| 2004/0123150 A1 | 6/2004 | Wright et al. | |
| 2004/0123153 A1 | 6/2004 | Wright et al. | |
| 2005/0055578 A1 | 3/2005 | Wright et al. | |
| 2005/0120242 A1 | 6/2005 | Mayer et al. | |
| 2005/0132184 A1 | 6/2005 | Palliyil et al. | |
| 2005/0164675 A1 | 7/2005 | Tuulos et al. | |
| 2005/0191988 A1 | 9/2005 | Thornton et al. | |
| 2005/0240999 A1 | 10/2005 | Rubin et al. | |
| 2005/0246767 A1 | 11/2005 | Fazal et al. | |
| 2006/0005244 A1 | 1/2006 | Garbow et al. | |
| 2006/0015868 A1 | 1/2006 | Rechterman et al. | |
| 2006/0048218 A1 | 3/2006 | Lingafelt et al. | |
| 2006/0075218 A1 | 4/2006 | Barragy et al. | |
| 2006/0112416 A1 | 5/2006 | Ohta et al. | |
| 2006/0112427 A1 | 5/2006 | Shahbazi | |
| 2006/0117177 A1 | 6/2006 | Buer | |
| 2006/0191011 A1 | 8/2006 | Korkishko et al. | |
| 2006/0203815 A1 | 9/2006 | Couillard | |
| 2006/0218635 A1 | 9/2006 | Kramer et al. | |
| 2006/0224742 A1 | 10/2006 | Shahbazi | |
| 2007/0078858 A1* | 4/2007 | Taylor et al. | 707/10 |
| 2007/0087761 A1 | 4/2007 | Anjum et al. | |
| 2007/0101430 A1 | 5/2007 | Raikar | |
| 2007/0113282 A1 | 5/2007 | Ross | |
| 2007/0118652 A1* | 5/2007 | Diedrich et al. | 709/226 |
| 2007/0143824 A1 | 6/2007 | Shahbazi | |
| 2007/0168721 A1 | 7/2007 | Luiro et al. | |
| 2007/0174610 A1 | 7/2007 | Furuya et al. | |
| 2007/0192867 A1 | 8/2007 | Miliefsky | |
| 2007/0199060 A1* | 8/2007 | Touboul | G06F 21/562 726/11 |
| 2007/0233827 A1 | 10/2007 | McKnight | |
| 2007/0294744 A1 | 12/2007 | Alessio et al. | |
| 2007/0300312 A1 | 12/2007 | Chitsaz et al. | |
| 2008/0022093 A1 | 1/2008 | Kurien et al. | |
| 2008/0040790 A1 | 2/2008 | Kuo | |
| 2008/0046713 A1 | 2/2008 | Barragy et al. | |
| 2008/0046965 A1 | 2/2008 | Wright et al. | |
| 2008/0052395 A1 | 2/2008 | Wright et al. | |
| 2008/0066179 A1 | 3/2008 | Liu | |
| 2008/0077971 A1 | 3/2008 | Wright et al. | |
| 2008/0091613 A1 | 4/2008 | Gates et al. | |
| 2008/0104662 A1 | 5/2008 | Young | |
| 2008/0109245 A1 | 5/2008 | Gupta | |
| 2008/0109679 A1 | 5/2008 | Wright et al. | |
| 2008/0141335 A1 | 6/2008 | Thomas | |
| 2008/0155645 A1 | 6/2008 | Hutnik et al. | |
| 2008/0189788 A1 | 8/2008 | Bahl | |
| 2008/0222692 A1 | 9/2008 | Andersson et al. | |
| 2008/0250408 A1* | 10/2008 | Tsui | H02J 7/0055 718/100 |
| 2008/0256536 A1 | 10/2008 | Zhao et al. | |
| 2009/0022118 A1 | 1/2009 | Behzad et al. | |
| 2009/0044146 A1 | 2/2009 | Patel et al. | |
| 2009/0119740 A1 | 5/2009 | Alperovitch et al. | |
| 2009/0157419 A1 | 6/2009 | Bursey | |
| 2009/0178132 A1 | 7/2009 | Hudis et al. | |
| 2009/0210244 A1 | 8/2009 | Koister et al. | |
| 2009/0228950 A1 | 9/2009 | Reed et al. | |
| 2009/0234907 A1 | 9/2009 | Lary et al. | |
| 2009/0254716 A1 | 10/2009 | Acedo et al. | |
| 2009/0254998 A1 | 10/2009 | Wilson | |
| 2009/0282476 A1 | 11/2009 | Nachenberg et al. | |
| 2009/0328034 A1 | 12/2009 | Corcoran et al. | |
| 2010/0011432 A1* | 1/2010 | Edery | G06Q 10/06375 726/11 |
| 2010/0027552 A1 | 2/2010 | Hill | |
| 2010/0043008 A1 | 2/2010 | Marchand | |
| 2010/0061250 A1 | 3/2010 | Nugent | |
| 2010/0125903 A1 | 5/2010 | Devarajan et al. | |
| 2010/0132016 A1 | 5/2010 | Ferris | |
| 2010/0138926 A1 | 6/2010 | Kashchenko | |
| 2010/0169497 A1 | 7/2010 | Klimentiev et al. | |
| 2010/0179856 A1 | 7/2010 | Paretti et al. | |
| 2010/0238840 A1 | 9/2010 | Lu et al. | |
| 2010/0241855 A1 | 9/2010 | Chou et al. | |
| 2010/0251328 A1 | 9/2010 | Syed et al. | |
| 2010/0287280 A1 | 11/2010 | Sivan | |
| 2011/0035248 A1 | 2/2011 | Juillard | |
| 2011/0131584 A1* | 6/2011 | Wang | H04L 12/581 718/104 |
| 2011/0173247 A1 | 7/2011 | Hubbard et al. | |
| 2011/0209140 A1 | 8/2011 | Scheidel et al. | |
| 2011/0258702 A1 | 10/2011 | Olney et al. | |
| 2012/0174227 A1 | 7/2012 | Mashevsky et al. | |
| 2012/0324259 A1* | 12/2012 | Aasheim | G06F 1/3206 713/320 |

FOREIGN PATENT DOCUMENTS

| | | |
|---|---|---|
| WO | WO 03/081932 | 10/2003 |
| WO | WO 2004/057834 | 8/2004 |
| WO | WO 2006/131124 | 12/2006 |
| WO | WO 2007/110094 | 10/2007 |
| WO | WO2007142478 | 12/2007 |
| WO | WO2008131446 | 10/2008 |
| WO | WO2008150710 | 12/2008 |

(56) References Cited

FOREIGN PATENT DOCUMENTS

WO   WO2010060139   6/2010
WO   WO2011117243   9/2011

OTHER PUBLICATIONS

Anderson et al., "High-Performance Task Distribution for Volunteer Computing" Space Sciences Laboratory. University of California, Berkeley. Sep. 23, 2005.

Nov et al., Volunteer Computing: A Model of the Factors Determining Contribution of Community-based Scientific Research. Apr. 26-30, 2010.

Belaramani et al., "Dynamic Component Composition for Functionality Adaptation in Percasive Environments", created Mar. 14, 2003.

Moti, "A Componenet-based Software System with Functionality Adaptation for Mobile Computing", The University of Hong Kong. Aug. 2002.

Ferreira et al.,":Introduction to Grid Computing with Globus", Sep. 2003.

Camargo et al., "Grid: An Architectural Pattern", Department of Computer Science. Jun. 2004.

Goldchleger et al., "InteGrade: object-orientated Grid middleware leveraging the idle computing power of desktop machines", Concurrency and Computation: Practice and Experience.vol. 16 No. 5:449-459 . Apr. 25, 2004.

European Search Report for European Application No. EP12164876 dated Aug. 14, 2012.

Russian Reference No. RU2446458 dated Mar. 27, 2012. Abstract Only.

Okamoto, "A Distributed Approach to Computer Virus Detection and Neutralization by Autonomous and Heterogeneous Agents", Nara Institute of Science and Technology. Nov. 23, 2004.

European Office Action for European Application No. 10193148.3 dated Jun. 14, 2012.

Application and File History for U.S. Publication No. 2010/0138926 published Jun. 2010, inventors Kashchenko.

"A Comparison of Thin and Thick Client Applications for Wireless and Mobile Applications" Retrieved on [Sep. 12, 2008], from the internet using the link<http://www.technologycrafters.com/technologycrafters/documents/Thick%20Vs%20Thin=%20Client.pdf>.

Cheng et al., SmartSiren: Virus Detection and Alert for Smarkphones. Jul. 14, 2007. XP040061026.

European Search Report for European Application No. 09151535 dated May 31, 2010.

Liu, "Security and Trust Management in Self-organizing Wireless Adhoc Networks", Distributed Data Intensive Systems Lab. 5 pages.

Panda Cloud Antivirus Support Forums. New Protection Model Explained. Post date Oct. 26, 2009.www.cloudantivirus.com.

Sastry, "Distributed Processing in Multi-Hop Packet Radio Networks". Final Report for the period Aug. 1, 1989 through Jun. 30,1991. Prepared for U.S. Army Research Office. ARO contract DAAL03-89-C-0017. Rockwell International Science Center.

Application and File History for U.S. Pat. No. 7,584,508, issued Sep. 1, 2009, Inventors Kashchenko.

Application and File History for U.S. Pat. No. 7,607,174 issued Oct. 20, 2009, Inventors Kashchenko.

Application and File History for U.S. Appl. No. 12/581,621, filed Oct. 19, 2009, Inventor Kashchenko.

* cited by examiner

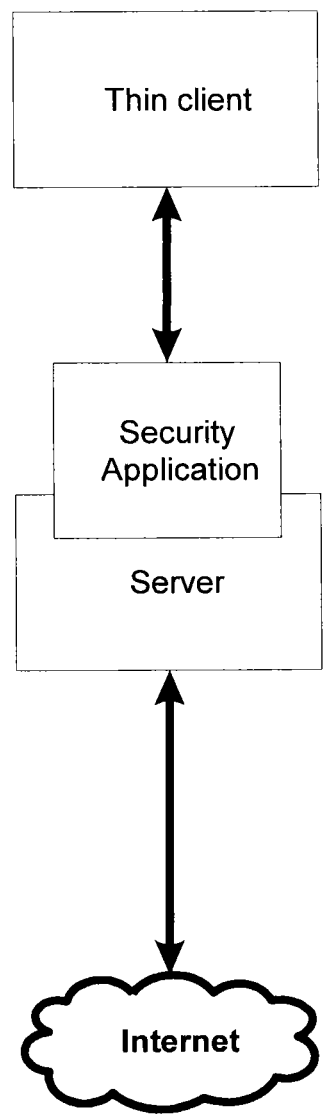
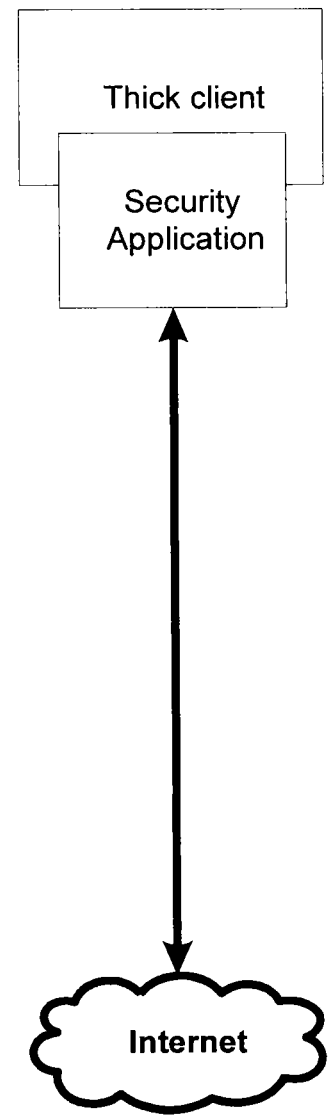
FIG 2C  FIG 2D

| Template ID | Predominant Risk Characteristic | User Action(s)/Logic | Criteria/Threshold(s) |
|---|---|---|---|
| 10041 | User divulging personal or sensitive information to third party | Connection to outside network/site AND Outside network/site includes any of<br>• {site appearing on list of banking/financial sites}<br>OR<br>• {Web page that includes form requesting personal information} | True<br><br>any one on the list<br><br><br>any one instance |
| 10042 | User unwittingly downloading malware | Repeated file download activity | >3 file downloads in a period of 4 hours |
| 10043 | Exposure to spam/phishing threats | User repeatedly clicking on links in html email messages | >2 hyperlink clicks in a period of 4 hours |
| 10044 | Exposure to hacker attacks/information or identify theft | User logs into unsecured wireless network | True |

*FIG. 5C*

| Name | Display | Processor | Drive | Battery | Communication |
|---|---|---|---|---|---|
| Asus EEE PC 900 | 8.9" | 900MHz Celeron | 8 Gb SSD | 4400-5200mAh, up to 3h 30min | Ethernet, 802.11 b/g |
| MSI Wind | 10" | 1.6 GHz Atom | 80-160 Gb SATA | 2200-5200mAh, 2.5-5.5 h | Ethernet, 802.11 b/g |
| HP 2133 Mini-Note PC | 8.9" | VIA C7 1.0-1.6 GHz | SSD, SATA | 4400-5200mAh, 2.5-4 h | Ethernet, 802.11 a/b/g |
| Dell Inspiron Mini 9 | 8.9" | 1.6 GHz Atom | 4-16 Gb SSD | 2200-3600mAh, up to 5h | Ethernet, 802.11 b/g |
| NanoBook | 7" | VIA C7 1.2 GHz | 30 Gb HDD | up to 4.5 h | |
| Sony Vaio UX Micro PC | 4.5" | Intel Core Solo 1.06-1.33 GHz | SSD, HDD | 1.5-7 h | 802.11 b/g |
| Samsung SCH-i730 | 2.8" | Intel PXA 520 MHz | SD | standby - up to 180-280 h | 802.11 b |

*FIG. 6B*

| Device | Performance rating |
|---|---|
| Device 1 | 1000 |
| Device 2 | 7000 |
| Device 5 | 32000 |
| Device 16 | 18000 |

*FIG. 6C*

| Performance rating | Configuration type |
|---|---|
| <1000 | Base (Management console, locations database, encryption tool) |
| 1000-10000 | Advanced (Added Antivirus, Firewall) |
| >10000 | All (Added Backup tool, Full base of intrusions description) |

*FIG. 6D*

| Device ID | Current Risk Profile | Current Computing Capacity | Trust Level Classification |
|---|---|---|---|
| S/N ABCD | AF6G44h$ssd | 25000 | Trusted |
| S/N BCDE | DL#h6h33j4 | 15000 | Probably Trusted |

*FIG. 8C*

| Load Level | Required Computing Capacity | Measure of Availability (%) |
|---|---|---|
| Low | <5000 | 90 |
| Medium | 5000-15000 | 70 |
| High | >15000 | 50 |

TEAM SECURITY FOR PORTABLE INFORMATION DEVICES

PRIORITY APPLICATION

This application claims priority to Russian Federation Patent Application No. 2010119567, filed May 18, 2010, and entitled "System for Providing Shared Security for Mobile Devices."

FIELD OF THE INVENTION

The invention relates generally to information technology and, more particularly, to a security system and associated methods that utilize teamwork concepts to make security for portable devices more efficient and robust.

BACKGROUND OF THE INVENTION

In today's world of personal information and communications systems, the prevalence of portable information devices is rapidly growing, particularly systems built on the netbook, or sub-notebook, platform, as well as multifunctional communication devices known as smartphones or personal digital assistants (PDAs), Ultra-Mobile Personal Computers, (UMPC), or Mobile Internet Devices (MIDs), utilizing processors such as Atom or Moorestown CPUs manufactured by Intel, or running operating systems such as Android, Symbian OS, Windows Mobile, and the like. Networks offering open access to the public, such as EDGE and 3G, and various WiFi networks (such as those based on the IEEE 801-type standards), have become commonplace and continue to grow in popularity.

As communication systems and devices grow in complexity and communications bandwidth, with data rates approaching tens of megabytes per second, the risk of users inadvertently obtaining malicious programs and other unwanted content also grows. Additionally, the increasing popularity of portable information devices having widely-available open-source applications, and open wireless networks create ever-increasing opportunities for malicious actors, such as hackers, identity thieves, spammers, and the like, to prey on users of these technologies. The quantity and severity of threats to computer systems, such as viruses, worms, malware, spyware, hacker attacks, as well as unwanted content, such as phishing attacks and other spam, continue to grow, and the increasing computing capabilities of portable information devices expose these devices to the universe of security threats.

Firewalls, intrusion detection or prevention systems, antivirus, antispam, and other such security applications geared toward personal computers are well-known. However, applying known approaches to portable information devices presents special challenges. Designers of portable information device systems and software have a principal objective of producing a device that provides timely access to information from practically any point in any city of the world. Portable information devices must be affordable in the highly-competitive, low-margin present-day market. Further, portable information devices must offer the utmost in portability and usability, meaning small overall device size and sufficiently long times of operation (at least on the order of 24 hours). Performance and usability are often countervailing objectives with affordability and portability, since batteries account for a large portion of the device's overall size, weight and cost. Performance and usability are even countervailing objectives with one another, since increased processor clock speeds and memory correspond to increased energy demands.

All these requirements make it difficult to simply increase processor power, data storage capacity, and other computing resources, to provide improved security for portable devices while maintaining performance, usability, portability, and cost attributes. These constraints, in turn, place limitations on the design of applications that run on portable information devices, especially security applications, which tend to require significant computing power to deal with the increasing quantity and complexity of security threats facing portable devices.

Therefore, effective security measures are needed that are particularly suited to meeting the unique needs of portable information devices.

SUMMARY OF THE INVENTION

One aspect of the invention is directed to a portable information device (PID) having a security module that conducts security-related functionality. At least some of the security-related functionality for the benefit of the PID is provided by a security team of at least one other PID. In one type of embodiment, when configured in a team processing mode, certain ones of the security functions or components operating for the benefit of the PID can be processed on one or more of the security team member devices. In another type of embodiment, the team of devices exchanges security-related information determined as a result of a single team member device's processing of one or more security-related tasks. This arrangement facilitates a collective security-related intelligence, or knowledge sharing, that benefits the entire team and avoids duplicating the processing of certain security-related tasks by the individual team member devices.

In one particular aspect, a PID having a dynamically configurable security arrangement includes computer circuitry (including a processor operatively coupled to a data store), a user interface (including display and user input devices), wireless communications circuitry, and a power supply that provides power to the computer circuitry, user interface, and wireless communications circuitry. The power supply includes an on-board energy source, such as a battery, for example, that enables mobility of the device. The computer circuitry includes a security arrangement that comprises a configurable security module, a computing capacity determining module, and a security configuration module.

The configurable security module, which is adapted to facilitate security services in the PID, is configurable to operate in a first mode in which certain ones of the security services are selectively provided locally on the PID by only the security module, and in a second mode where at least one other portable computing device provides certain ones of the security services. The at least one other portable computing device is communicatively coupled to the PID via an ad hoc wireless network using the wireless communication circuitry. The computing capacity determining module adapted to re-assess computing capacity availability relating to usage and performance expectations for operation of the information device. The security configuration module is adapted to reconfigure the operational settings of the security module such that the security module changes from operating in the first mode to operating in the second mode in response to a change in a computing capacity indication from the computing capacity determining module.

In related embodiments, the security configuration module is adapted to reconfigure the operational settings of the security module based on the computing capacity of security team member devices. In other embodiments, security functionality is preferentially distributed to team member devices having greater computing capacity availability.

In another related embodiment, the configurable security module includes a risk profiling module adapted to re-assess a current set of security risks to which the information device is exposed. The security configuration module is further adapted to dynamically reconfigure the operational settings of the security module such that the security module changes from operating in the first mode to operating in the second mode in response to a change in an indication of the current set of security risks from the risk profiling module.

In another aspect of the invention, a PID includes a security module adapted to provide team-assisted security services. The security module includes a thick client security portion adapted to locally process security-related tasks on the computer circuitry, and a security team connection module adapted to facilitate local wireless connectivity via the wireless communication circuitry between the PID and a security team of at least one other PID. The security module is adapted to conduct an exchange of security-related information between the thick client security portion and the at least one other portable information device via the security team connection module. Also, the security module is configured to process, via the thick client security portion, a first security task (of the security-related tasks) on the computer circuitry to produce a first security task output, and to transmit, via the security team connection module, the first security task output to at least one PID of the security team. The first security task may be processed in response to a remotely-generated request by at least one PID of the security team, or in response to a locally-determined need by the security module itself.

In another aspect of the invention, a method for distributing security-related processing to a team of at least one other portable information device communicatively coupled to the PID includes: maintaining, by the PID, a list of the at least one other portable information device that is authorized to process security-related tasks for the benefit of the PID; determining, by the PID, whether to distribute a security-related task to be processed by a device of the team that is different than the PID, wherein the determining is based on a characteristic of the task and on current available computing capacity of the PID; in response to a determination to distribute the security-related task, posting, by the PID, the task to a task list that is accessible to devices of the team; and receiving, by the PID, an output generated at least one device of the team in response to a completion of processing of the task.

A number of advantages will become apparent from the following Detailed Description of the Preferred Embodiments.

BRIEF DESCRIPTION OF THE DRAWINGS

The invention may be more completely understood in consideration of the following detailed description of various embodiments of the invention in connection with the accompanying drawings, in which:

FIGS. 2C and 2D one type of configurability of security arrangements according to embodiments of the invention, in which thin client and thick client configurations can be dynamically configured based on a variety of factors related to the configuration or operating state of the PID.

FIG. 5C illustrates several examples of behavior templates for use with the user behavior tracking module of FIG. 5B according to one embodiment.

FIGS. 6B and 6C are tables illustrating example sets of data contained in a device information database that is part of a computing capacity determining module, according to various embodiments of the invention.

FIG. 6D is a table that represents an example set of determined PID configuration types according to one aspect of the invention.

FIG. 8C illustrates an example portion of a devices database that includes dynamic information about each listed device according to one embodiment.

Figure 1A:
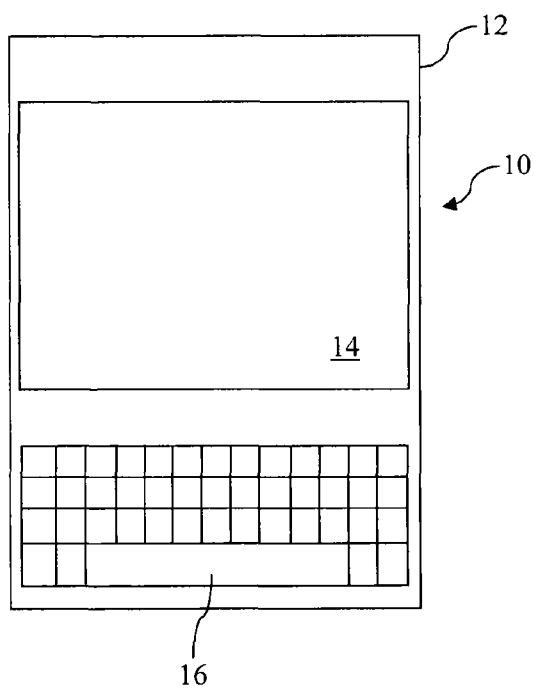
FIG. 1A is a block diagram illustrating major external components of a portable information device (PID) to which security arrangements according to aspects of the invention can be applied.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

FIG. 1A is a block diagram illustrating an exemplary portable information device (PID) 10. PID10 can be a smartphone, PDA, UMPC, MID, or any other small, lightweight computing and communications device. PID 10 includes a compact housing 12 that is small enough to make the device easily portable, and a user interface that includes display 14 and a user input device, such as keyboard 16. PID 10 can have a touchscreen display in which the display and user input devices are integrated.

Figure 1B:
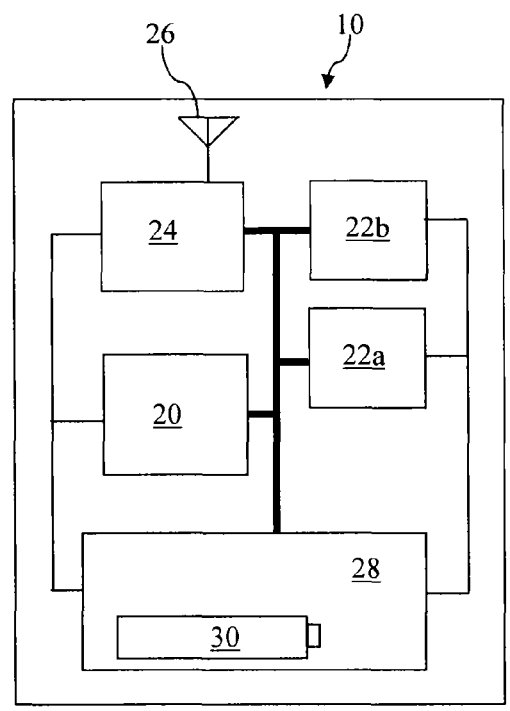
FIG. 1B is a block diagram illustrating major internal components of the PID of FIG. 1A.

FIG. 1B is a block diagram further illustrating additional functional components of PID 10. PID 10 further includes computer circuitry, such as processor 20 interfaced with a data store having RAM 22a and non-volatile memory 22b. Processor 20 is also interfaced with wireless communications circuitry 24, which can take the form of a mobile telephone radio (CDMA, GSM, Iridium, or the like), Wi-Fi, Bluetooth, or any other such communications circuitry, coupled to an antenna 26. It will be understood that processor 20 is interfaced with the user interface devices, and with any other peripheral devices that may form a part of PID 10. PID10 also includes power supply 28 with an on-board energy source 30 exemplified as illustrated in FIG. 1B in the form of a battery, enabling truly portable and mobile operation. Power supply 28 provides appropriate power to all of the components of PID10 from energy source 30, and includes circuitry to enable external power to be supplied to operate PID 10 and to charge energy source 30.

Although today's practical devices tend to utilize certain technologies predominantly, such as CMOS-based microcontrollers, DRAM, Flash non-volatile memory, radio frequency devices for communications, batteries for energy storage, and the like, it should be understood that the invention is in no way limited to any particular set of technologies. Some aspects of the invention are directed to addressing challenges often experienced by small personal computing and communications devices, without regard to particular architectures or technologies, in which inherent trade-offs can exist between performance and user experience on the one hand, and energy demands, portability, and size, on the other hand.

When used as a data communications device, portable devices such as PID 10 typically links to a host network, which in turn provides connectivity over a wide area network such as the Internet. Host networks may be operated by cellular telephone service providers, as in the case with smartphone-type 3G devices. Other types of common host networks can include IEEE 802.11 Wi-Fi hotspots on local area networks (LANs) that are connected to the Internet via Internet Service Providers (ISPs). Portable devices can also connect with other devices to form a mesh network. Regardless of the type of arrangement of the host network, any arrangement in which a PID makes use of any service, such as Internet connectivity, for example, from another computing device, is a client-server arrangement where the PID is the client, and the computing device that provides the service is the server.

Figure 1C:
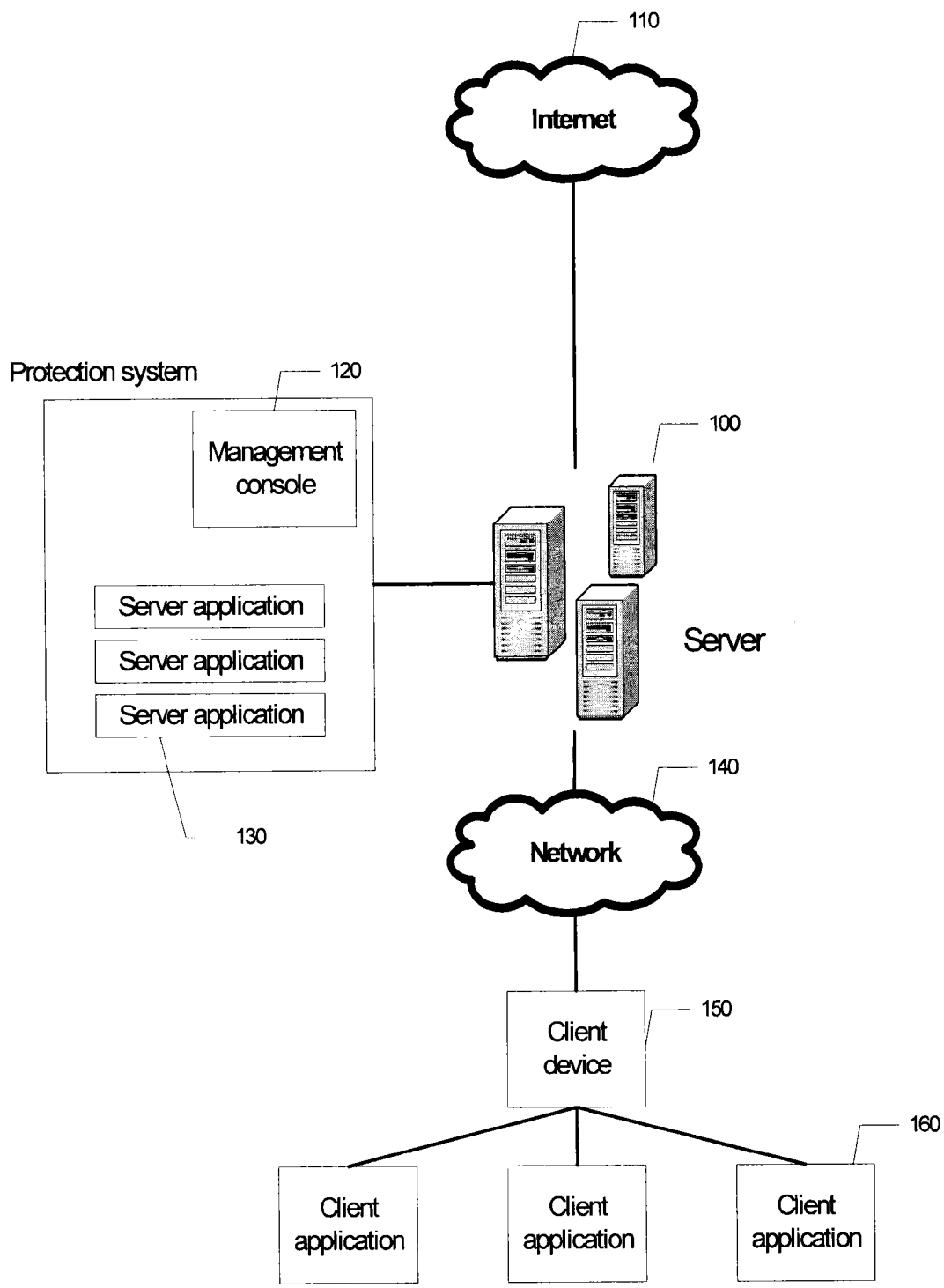
FIG. 1C illustrates a system architecture that includes security provisions that protect a client device from various threats.

FIG. 1C illustrates a system architecture that includes security provisions that protect client device 150 from various threats. Server 100 controls traffic that travels to network 140 from outside network 110, such as the Internet. Client device 150 represents any of a variety of PIDs. Client device 150 runs various applications 160. Server 100 runs various applications 130, which support or facilitate the operation of client applications 160. One example of an application 130 is a Web server application. In addition to server applications that support or facilitate the primary functions of the client applications, the server has applications for security. Management console 120 provides administrator access for controlling server applications 130, and for changing different application settings. Management console 120 has its own graphical user interface (GUI), which allows for the administrator of the server to make adjustments to the server applications 130 in real time. With the provision of console 120, the administrator can control both, the applications for security, and other various applications, which operate on the server.

Figure 1D:
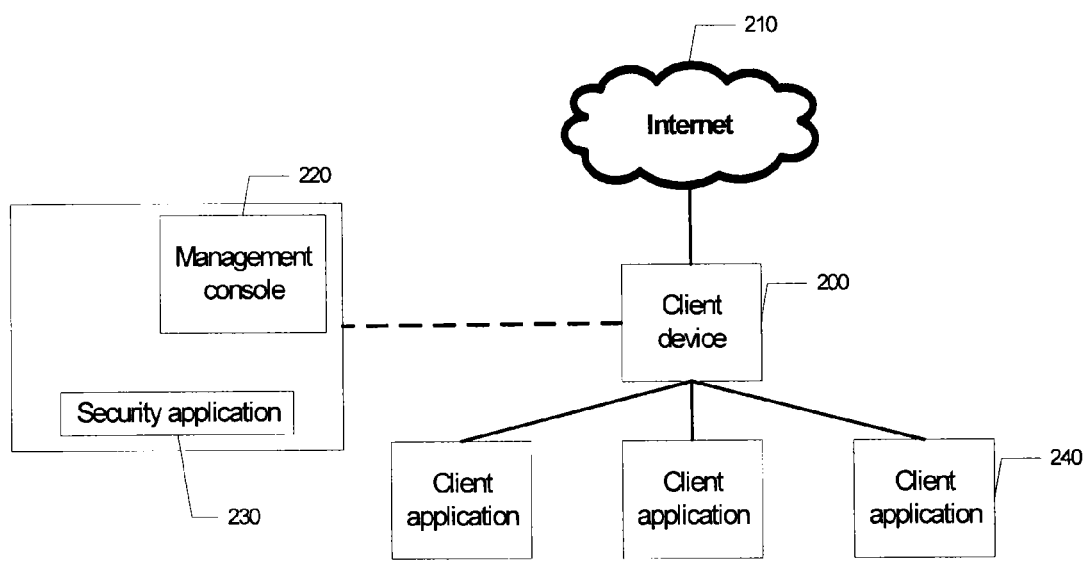
FIG. 1D is a schematic diagram of an operational arrangement of a client device, which is used by a user in unprotected network.

FIG. 1D is a schematic diagram of an operational arrangement of a client device 200, which is used by a user in unprotected network 210. Client device 200 runs various client applications 240. Such an arrangement can exist when the user of client device 200 attempts to access the Internet at cafes, hotels, airports, or other public places, or attempts to load software updates, while located in such places.

Conventionally, client device 200 would need to be supplied with its own security application 230. Utilizing management console 220, the user of client device 200 can adjust the settings of security application 230 to set a level of protection based on user-perceived needs. For instance, the user may deem it appropriate to increase the aggressiveness of an antivirus scanning program that is a part of security application 230, when the user is connected to the Internet via a public network. This arrangement is an example of a thick client security application that runs locally on client device 230 to provide protection for client applications 240.

One challenge faced by such an arrangement is the thick client security application 230 can be limited by insufficient system resources needed to run client applications 240. Similarly, client applications 240 can be limited by the drain of computing resources needed to run security application 230. Even with sufficient computing resources, the drain on the battery from the intensive processing of both, the security application 230, and client applications 240, can dramatically reduce the mobility and usability of the portable information device between charges. For these, and other reasons, a conventional thick client security arrangement is not a fully-capable substitute for a global security arrangement such as the one described above with reference to FIG. 1C.

Figure 1E:
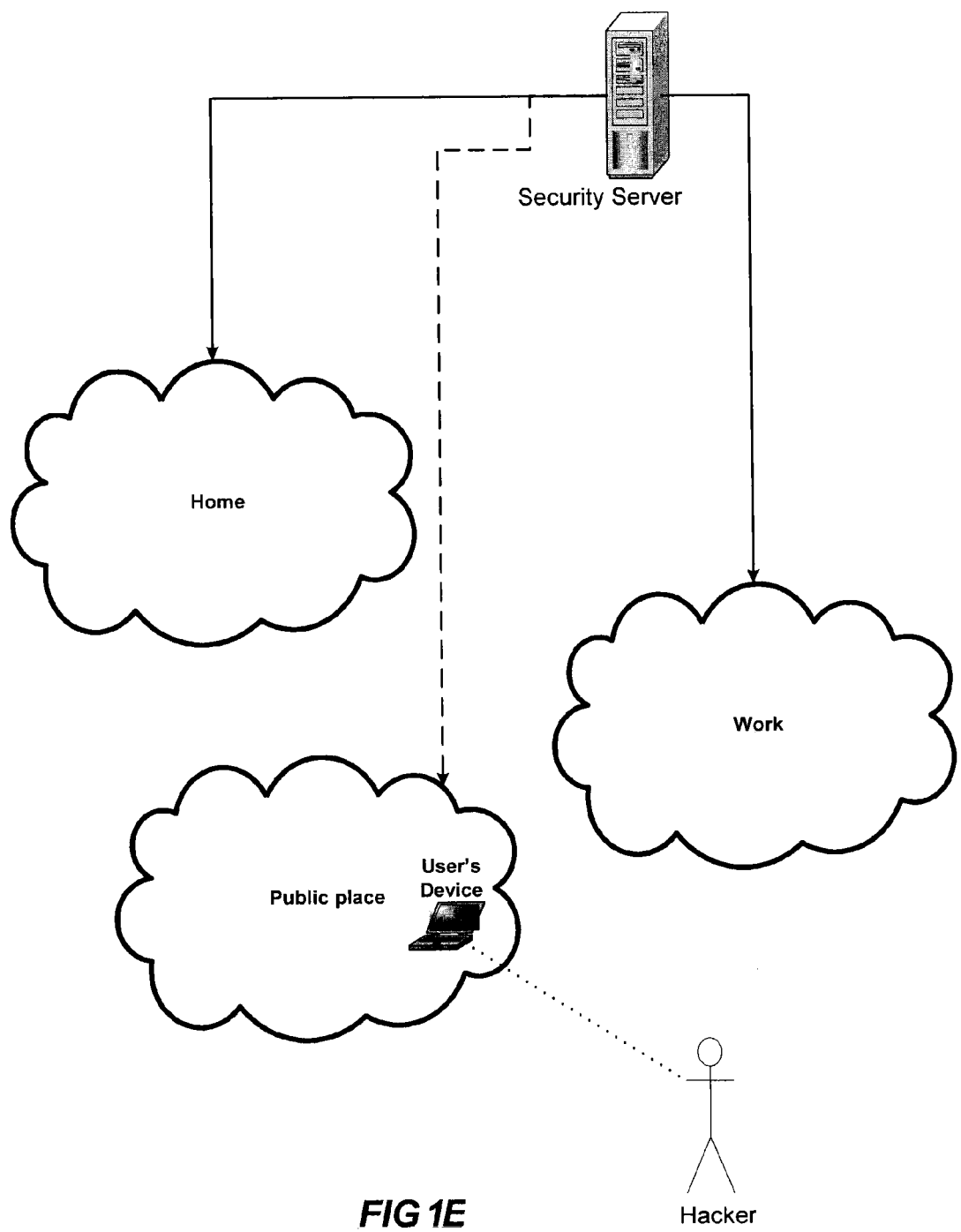
FIG. 1E is a diagram illustrating a common risk scenario in which the user of the client device cannot be confident in the overall protection of its data.

FIG. 1E is a diagram illustrating a scenario in which the user of the client device cannot be confident in the overall protection of its data. While the user may be confident that the home and work networks have the benefit of a security server, such as a firewall at the host network, a the user cannot have the same confidence in other places, where the user's device can be subjected hacker attacks or unknown programs that might defeat any non-robust local firewall or other security measures on the user's device.

Figure 2A:
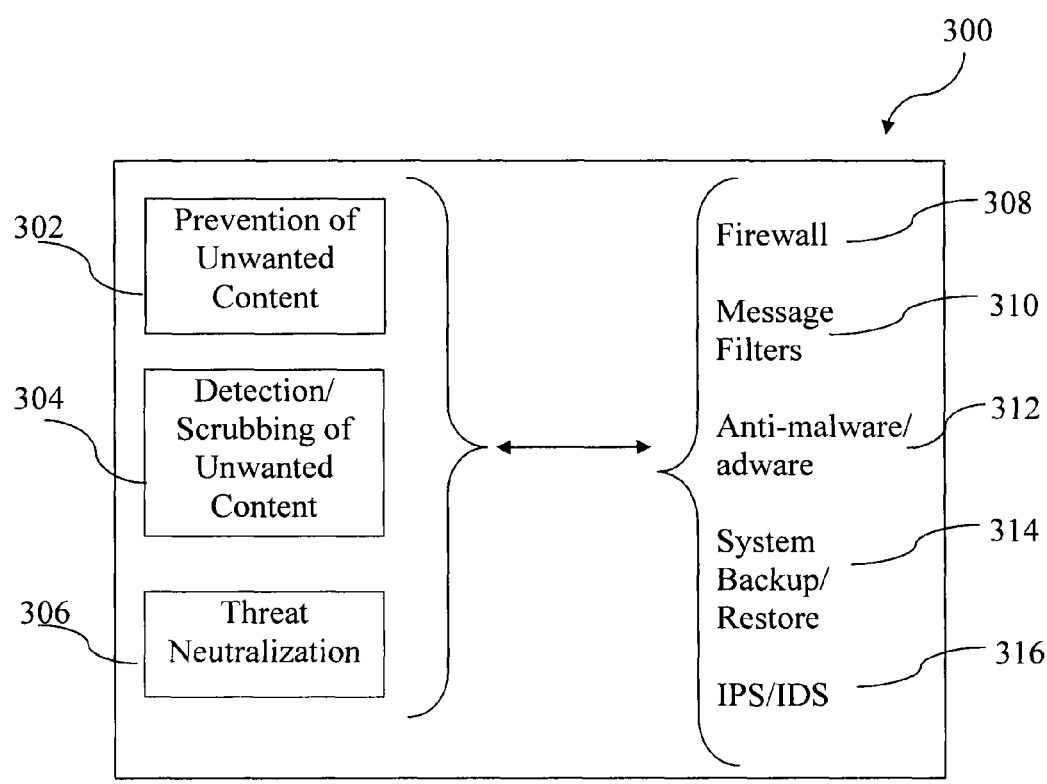
FIG. 2A is a diagram of a local security module that runs on a portable information device according to one aspect of the invention.

FIG. 2A is a diagram of a local security module 300 that runs on a portable information device according to one aspect of the invention. The term "module" as used herein means a real-world device or component implemented using hardware, such as by an application specific integrated circuit (ASIC) of field-programmable gate array (FPGA), for example, or as a combination of hardware and software, such as by a microprocessor system and a set of instructions to implement the security module functionality. A module can also be implemented as a combination of the two, with certain functions facilitated by hardware, and other functions facilitated by a combination of hardware and software. In certain implementations, at least a portion, and in some cases, all, of a module can be executed on the processor of the PID that executes application programs, such as processor 20 of PID 10. Accordingly, security module 300 can be realized in a variety of configurations, and should not be limited to any particular implementation exemplified herein.

Security module 300 performs any combination of one or more security-related functions, such as prevention of unwanted content 302, detection/scrubbing of unwanted content 304, and threat neutralization 306. These security-related functions are described below only generally, by way of illustration, and are not intended to be a required or exhaustive list of security functions within the spirit of the invention as it applies to security module 300. A variety of other security-related functions can be present in addition to, or in place of, any of the functions exemplified herein.

Prevention of unwanted content 302 includes blocking unwanted content, such as viruses, worms, and other malware, adware, spyware, spam, and the like, as well as undesired data traffic, such as hacker attacks, before any of these threats or programs can be placed on the local device. Typically, this function involves blocking or diverting of content or data traffic at a firewall. Detection/scrubbing of unwanted content 304 would apply to content that may have penetrated the prevention function, and now resides in some form on the local device. A typical example of this functionality would include scanning for viruses based on a database of virus definitions, and removing or quarantining those program instructions or associated data. Threat neutralization 306 applies to detected unwanted content or detected attacks or threats in progress, and involves taking action to terminate any suspect programs or processes, stop network traffic, and restore the system to a previous known safe state.

Security module 300 includes a variety of components, such as, for example, firewall 308, message filters 310, anti-malware/adware blocking/removal tool 312, system backup/restore utility 314, and intrusion prevention or detection system (IPS/IDS) 316. These components can work in different combinations to achieve the various functions of security module 300.

In one embodiment, security module 300 facilitates configurability of its functions. For example, one type of configurability is the ability to selectively turn individual components or functions on or off. Another type of configurability is the ability to dynamically adjust the operation of individual functions or components. For example, operational settings of firewall 308 or IPS/IDS 316 can be adjusted in one embodiment to set a level of protection to be more or less aggressive, based on the needs of the operator or of the system.

In another example, anti-malware/adware component 312 is adjustable. Anti-malware/adware component 312 has a database of known threat definitions, which it uses to scan the data store for the presence of any known threats. In one embodiment, the threat definitions database can be limited or expanded with additional threat definitions, based on the system or user needs.

In related embodiments, various other operational settings of security module 300 can be adjusted automatically, i.e., without user intervention. Aspects of the invention recognize that different operational settings of a variety of different security functions or components can be adjusted, without limitation to the examples described herein.

Figure 2B:
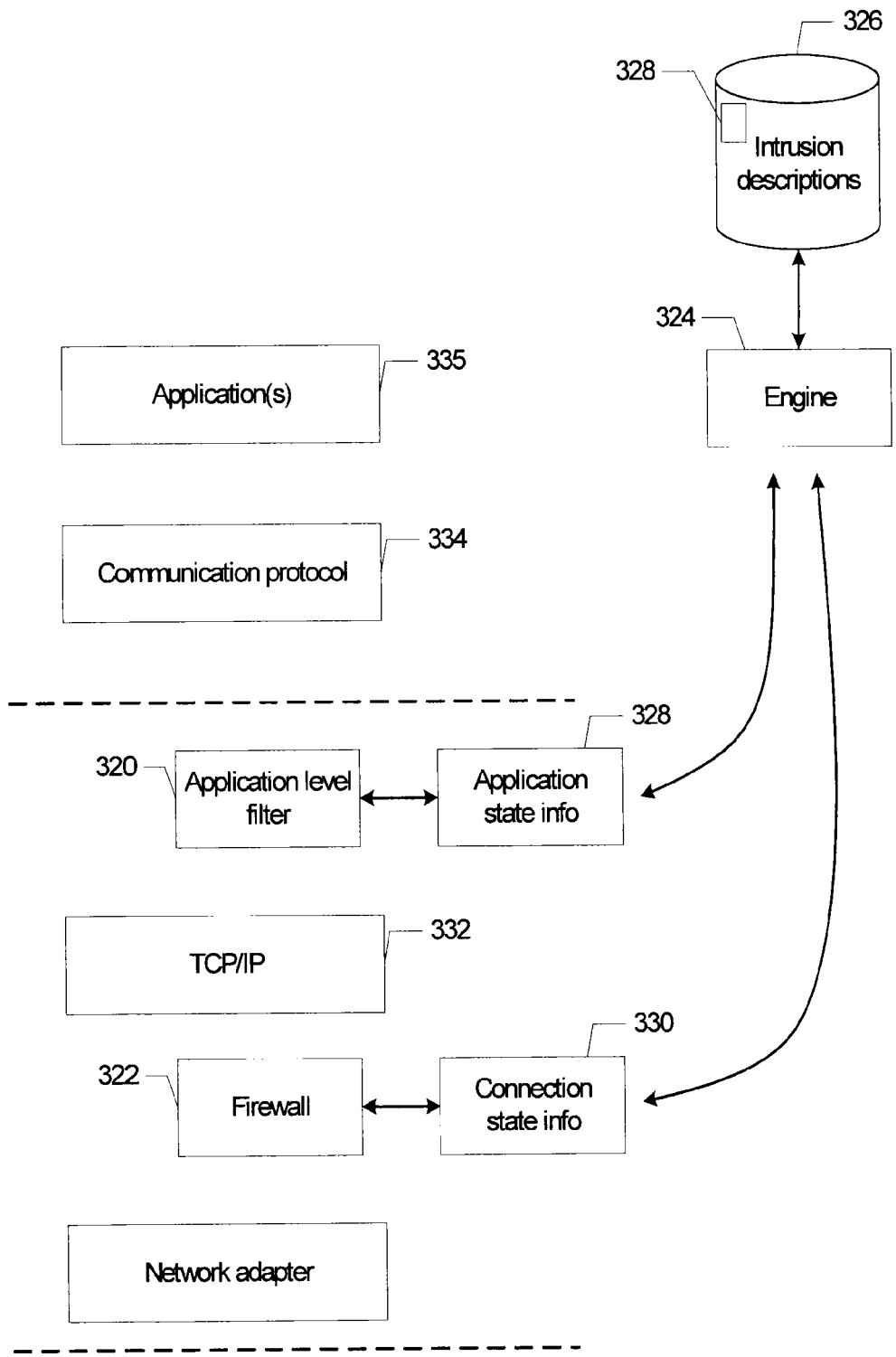
FIG. 2B is a diagram depicting a security module according to one aspect of the invention that includes application-level protection, in which the configuration can be adjusted based on the application programs of the PID.

FIG. 2B depicts a security module including application-level protection according to one embodiment, in which the configuration can be adjusted based on the application programs of the PID. Application level filters 320 and firewall 322 obtain information about the local system's operation from the various OSI model layers. Engine 324 which, with the aid of intrusion description database 326, operates to isolate known threats or attacks and analyzes incoming traffic. In one embodiment of intrusion description database 326, the descriptions of threats are represented in XML format. Each threat description 328 can include various items of information such as, for example, the type of application, its version, registry entries associated with the application, the vulnerable port, etc. For each threat description, the various items of information are utilized to establish special rules for monitoring and filtering incoming network traffic. Being threat-specific, the rules can be tuned for dealing with certain types of attacks or for specialized applications.

Engine 324 is communicatively coupled with two information channels: application state information 328, and connection state information 330, which in turn are respectively coupled with application level filter 320, and firewall 322. Each time a network connection is established, or whenever an application 335 begins to use a particular port, engine 324 determines, based on the contents of database 326, whether there is any significant likelihood that any known threats are present. Any threats identified in this manner would constitute a relatively small, but more highly relevant, subset of the available known threats. This small subset can thus be practically analyzed and tracked.

In operation, firewall 322 intercepts only a small portion of the total data traffic, since connection state information 330 primarily includes communication protocol and related information such as Internet Control Message Protocol (ICMP) commands. Still, a large portion of potential threats requires a more thorough analysis and more detailed information about the threats and their impact on their targeted computer system. Accordingly, information obtained only through analysis of the TCP/IP protocol is insufficient to provide a robust level of protection.

At the application level, the specialized filter 320 makes it possible to concentrate threat analysis on the specific set of vulnerabilities that are known for each application 335. Application level filter 320 intercepts the traffic between the TCP/IP service 332 and communication protocol layer 334. The intercepted traffic is analyzed by engine 324 separately for each application. In one embodiment, the security system identifies active applications (e.g., MS Outlook Mobile). In a related embodiment, the system determines the types of active applications (e.g., Web browser, games, etc.) based on the port(s) being utilized and the types of data communications protocols are being used. Thus, the system obtains knowledge of either the specific active applications or the types of applications in use. With this information, the system selects appropriate protection schemes that are tailored to the present applications or activities. Thus, the system concentrates security resources on only the relatively small group of rules and the description of threats 326 associated with the exposure of the particular applications currently running.

FIGS. 2C and 2D illustrate another type of configurability of security arrangements according to embodiments of the invention. The thin client and thick client configurations shown respectively in FIG. 2C and FIG. 2D can be dynamically configured based on a variety of factors related to the configuration or operating state of PID 10, as will be described in more detail below. The dynamic configurability provided by these embodiments enables an adequate level of security to be maintained while permitting better computing performance, or better mobility, or both, of the user's device. Accordingly, the user can remain confident that a suitable security configuration will exist notwithstanding where the user may be connecting to the network. If the user's device is located in a particular local area network known to be secure, the configuration of FIG. 2C is selected, in which the security application existing on the local network's server is relied upon. In this case, the user's device will adopt a thin-client security configuration in order to off-load the security-related computing load entirely upon the server. In this thin-client configuration, the user's device has more computing resources available for running ordinary (non-security) applications, thereby achieving better performance and energy economy.

If, on the other hand, the user's device has been determined to be connected to the Internet through a local area network that is not known to have adequate security, the configuration of FIG. 2D is selected. The arrangement of FIG. 2D has the security application running locally on the user's device in a thick client configuration. Although the user's device will have reduced computing performance for non-security applications, the thick client security arrangement of FIG. 2D will provide adequate security in the absence of a protected network.

In related embodiments, a hybrid thin client/thick client security arrangement can be configured, in which certain security functions are off-loaded to the server, while other security functions are executed locally on the user's portable information device. For example, in one such hybrid configuration, PID 10 runs a reduced-function firewall that controls network traffic to of outbound data and blocks all unauthorized inbound traffic, but does not take on the burden of scanning authorized inbound traffic for potentially harmful data payloads. In this hybrid configuration example, a security server takes on the computing-intensive remaining firewall functionality of scanning data communications for potential threats, and responding to those threats.

Figure 2E:
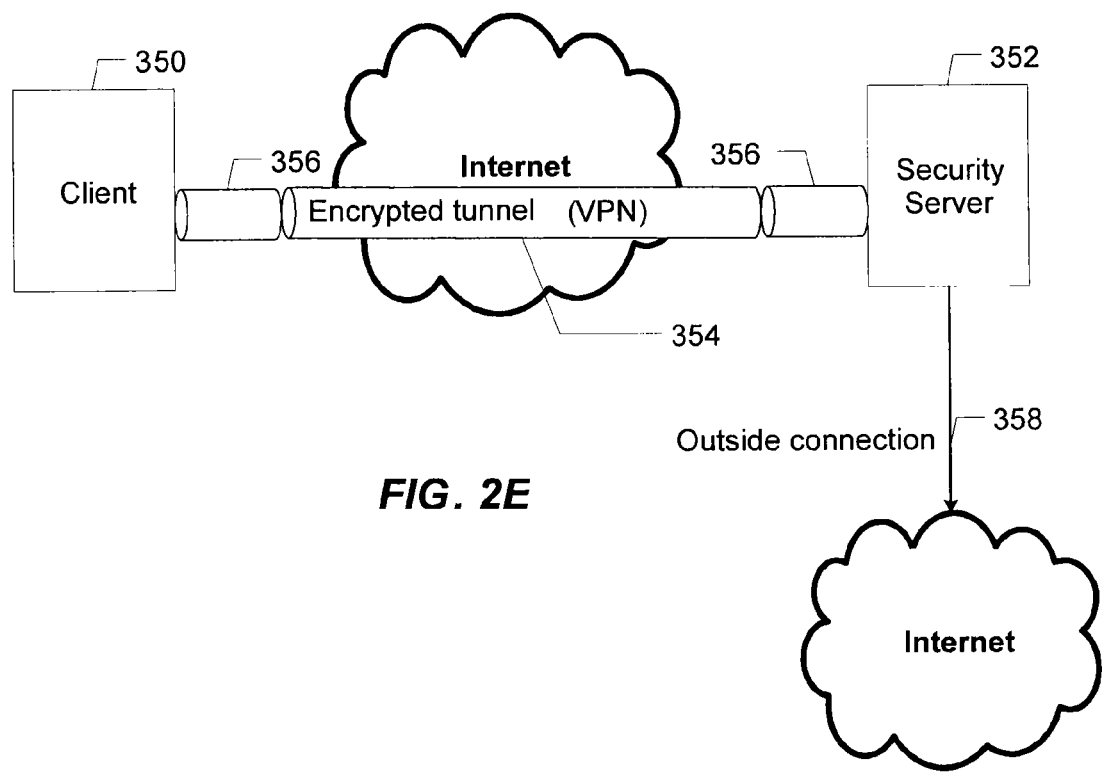
FIG. 2E illustrates a communication channel according to one embodiment of the invention that facilitates operating a thin-client or a hybrid security arrangement in which a majority of security-related functions are carried out by a remote security server.

FIG. 2E illustrates a communication channel according to one embodiment that facilitates operating a thin-client or a hybrid security arrangement in which a majority of security-related functions are carried out by a remote security server. This arrangement can be used in cases where the user of client device 350 is located remotely from security server 352, but wishes to utilize its resources. Likewise, the arrangement can be utilized where the user of client device 350 requests or requires the use of a remote security system, in which case protected network 352 would perform various security functions for the benefit of client device 350. In this aspect of the invention, a secure connection with security server 352 includes virtual private network (VPN) connection 354, and an additional encrypted connection 356, into which is embedded VPN connection 354. In one type of embodiment, encryption is achieved on the basis of a known client identifier, such as, for example, personal data of a user, or unique hardware parameters. The various parameters upon which the encryption is based can be created in advance by the user, i.e., prior to the time when the user wishes to use the secure connection. After establishment of the secure connection between client device 350 and security server 352, the user of client device 350 can safely access the resources of security server 352, or its outside connection 358. Outside connection 358 can be an Internet connection, or a connection to some other normally unsecured network that is made secure with the protective software running on security server 352. In a related embodiment, encrypted connection 356 monitors the integrity of VPN connection 354, and takes steps to restore the connection in case the monitoring detects an unplanned termination of the connection for any reason.

Another aspect of the invention is directed to implementing decision criteria for when, and how, to automatically configure the security arrangement for PIDs. Configuration can be set locally, such as by a configuring process running on PID 10. Alternatively, configuration can be set remotely, such as by a remote security server. In one embodiment in which configuration is set locally, a security configuration module running locally on PID 10 is tasked with determining when to configure or re-configure the security module, and what operational settings to establish. The security configuration module can receive, monitor, or otherwise obtain information about the system configuration, the operating state of PID 10, relevant history of PID 10, global security situational information, user preferences, or any combination of these. In turn, this information would be used in the automatic configuring of the security module. System configuration data can include, device type, processor speed, memory size, processor bus speed, battery capacity, a list of installed applications, and a list of frequently-used applications.

In an embodiment where configuration of the security module is done remotely, PID 10 establishes a connection with a remote security server, and transmits system configuration, operating state, relevant history, global security situational information, user preferences data, etc., to the server. The server receives and analyzes the transmitted data, and issues a command back to PID 10 to adjust the configuration settings of the security module.

Operating state data can include items such as the physical location of PID 10, network traffic speed, network traffic volume, remaining battery capacity, amount of memory allocated, a list of applications currently running, or processor idling time. Relevant history of PID 10 includes items such as recent history of detected attacks, higher-than-normal frequency of pings or attempted connections from unknown sources, and the like. Such items can be correlated to location information. Global security situational information can include items such as a current overall state of threats that exists. For instance, a prevalence of a particular worm, patterns of server outages attributable to denial-of-service attacks, and the like, would tend to increase the overall threat level. This type of information is constantly monitored by security firms, and can be provided to PID 10 during a security update, for example. User preferences can include items such as a risk tolerance input provided by a user, or performance requirements.

Figure 3A:
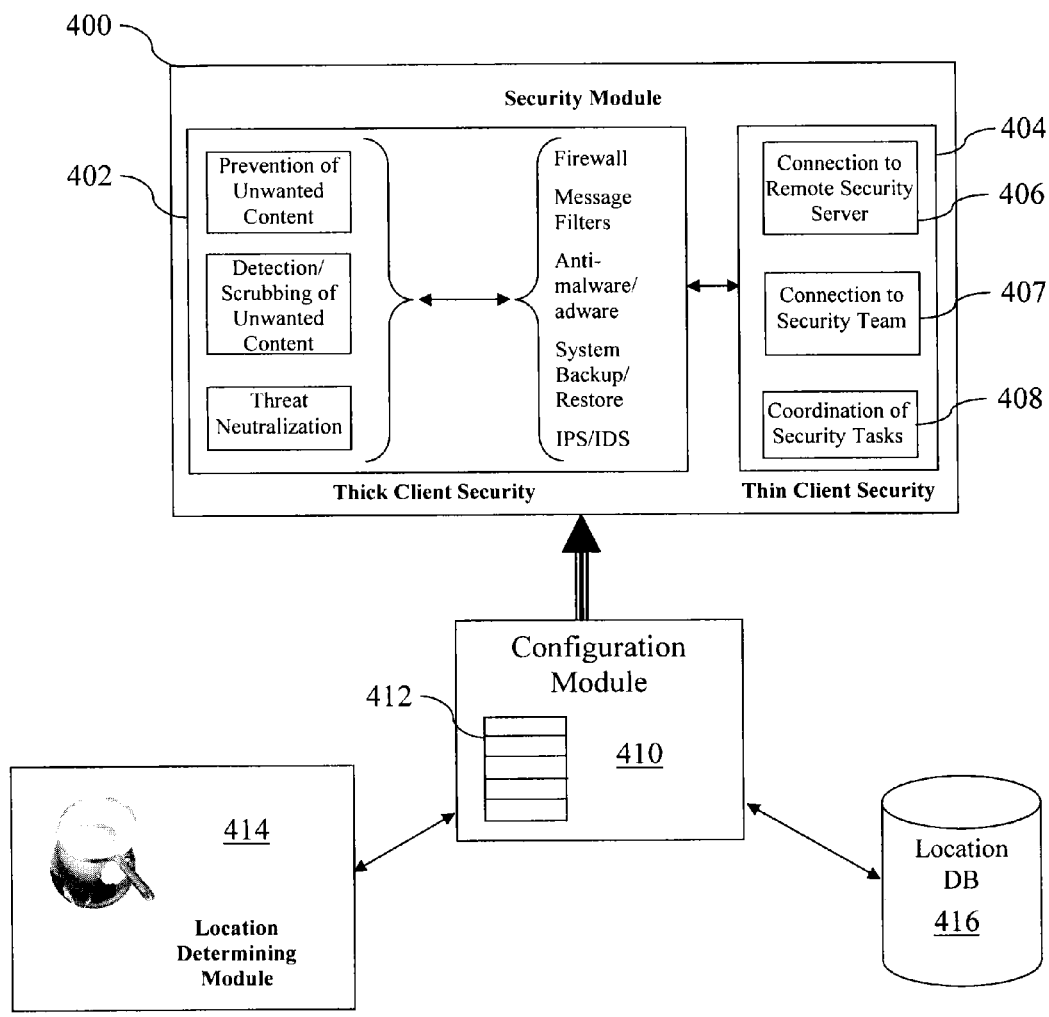
FIG. 3A is a block diagram illustrating a security arrangement according to one embodiment of the invention in which a configurable security module existing on a PID can be automatically configured based on a present location of the PID.

FIG. 3A illustrates a security arrangement according to one embodiment in which configurable security module 400 existing on PID 10 can be automatically configured based on a present location of PID 10. Security module 400 includes a thick client security portion 402, and a thin client security portion 404. Thick client security portion 402 is similar to security module 300 described above in that it can include a variety of security functions and components, each of which can be individually configured or adjusted.

Thin client security portion 404 facilitates a connection an information exchange with one or more external processors, which can be in the form of at least one security server, or at least one other computing device (mobile or otherwise) that can work with security module 400 of PID 10 to collectively provide security-related functionality as a team.

Thin client security portion 404 includes a security server connection module 406 that manages one or more connections to one, or a group of, remote security servers, and facilitates the exchange of data with the one or more servers. In one embodiment, security server connection module 406 is configured with network addresses of various available security servers, and implements logic for deciding which security server(s) to utilize (dynamically changing servers if appropriate), and operates to pass data between security module 400 and the security server(s) based on a configuration established by task coordinating module 408 (discussed below). One type of embodiment utilizes an encrypted tunnel connection such as the one described above with reference to FIG. 2E.

Security team connection module 407 of thin client security portion 404 facilitates an aspect of the invention in which at least some of security-related functionality for the benefit of PID 10 is provided by a team of at least one other device. In one type of embodiment, when configured in a team processing mode, certain ones of the security functions or components operating for the benefit of PID 10 can be processed on one or more mobile devices other than PID 10. In a related type of embodiment, the team of devices exchanges security-related information to facilitate a collective security-related intelligence that benefits the entire team. The team of devices that participates in security processing distribution, and in information exchange for collective security benefit, is hereinafter referred to as a security sharing team. Accordingly, security team connection module 407 dynamically establishes, and coordinates communication with other devices that may constitute team members.

In one type of embodiment, security team connection module 407 includes the drivers and other program instructions that facilitate the team interconnectivity. In another type of embodiment, security team connection module 407 utilizes drivers and services provided by the operating system of PID 10 for team interconnectivity. Other embodiments use a combination of security module-specific, and standard functionality. In any of these embodiments, the drivers and program instructions operate to establish a small ad hoc network among the security sharing team members that are within communications range. Any suitable process for establishing such networking can be employed, which carry out the necessary operations of recognizing other devices that already are known as security sharing team members, or those that can potentially become security sharing team members, permitting those other devices to receive security-related process distribution information from PID 10, and permitting other devices to send security-related process distribution information to PID 10 in accordance with coordinated security sharing team functionality. In various embodiments, known techniques for ad hoc networking, such as those described by Xiuzhen Cheng, Xiao H. Huang, and Dingzhu Du, *Ad Hoc Wireless Networking*, Kluwer Academic Publishers, 2004, incorporated by reference herein, are employed. The operation of related embodiments of security team connection module 407 is described in greater detail below in the context of team security operations.

Thin client security portion 404 also includes task coordinating module 408 that exchanges information between thick client security portion 402 and the remote security server(s) or team of devices. The role of task coordinating module 408 also includes ensuring proper overall operation when a hybrid security arrangement is in place in which portions of thick client security portion 402 operate in conjunction with the remote security server via thin client security portion 404.

The security arrangement of FIG. 3A further includes security configuration module 410, which interfaces with security module 400 and establishes or adjusts the security module's configuration and operational settings based on various inputs and on decision criteria 412. One type of input is the present location of PID 10, provided by location determining module 414.

Location determining module 414 determines, or simply estimates, in real-time, where PID 10 is situated, or which local network PID 10 might be utilizing in order to connect to the Internet. In one such embodiment, location determining module 414 includes a global positioning system (GPS) receiver to determine physical location. In a related embodiment, location determining module 414 utilizes a network topology analyzer that analyzes data packets in order to deduce the location or network identity of the local network through which PID 10 may be communicating. The nature of location information provided by either method is different, so the two methods may be used in conjunction with one another to produce a better estimation of the location or network being used. In another related embodiment, location determining module 414 includes a user interface component that permits a user of the device to enter his or her location. The user interface input may be used in conjunction with either the GPS location or the network topology determination in order to fine-tune the location or network identity. For instance, the user may be presented with two or three possible choices from which to select the network being used, those choices having been automatically generated based on information deduced by the other location determining methods.

The position of the client device can be ascertained in various ways within the spirit and scope of aspects of the invention. A number of other techniques for determining the geographic position of a networked device are generally known, and any suitable technique can be utilized.

Security configuration module 410 uses the location identification to ascertain a security risk profile for the present location. Based on the security risk profile, configuration module 410 uses decision criteria 412 to set a suitable configuration for security module 400. Security configuration module accesses location profile database 416 to look up the present location from among a list of local networks at different geographic locations.

Figure 3B:
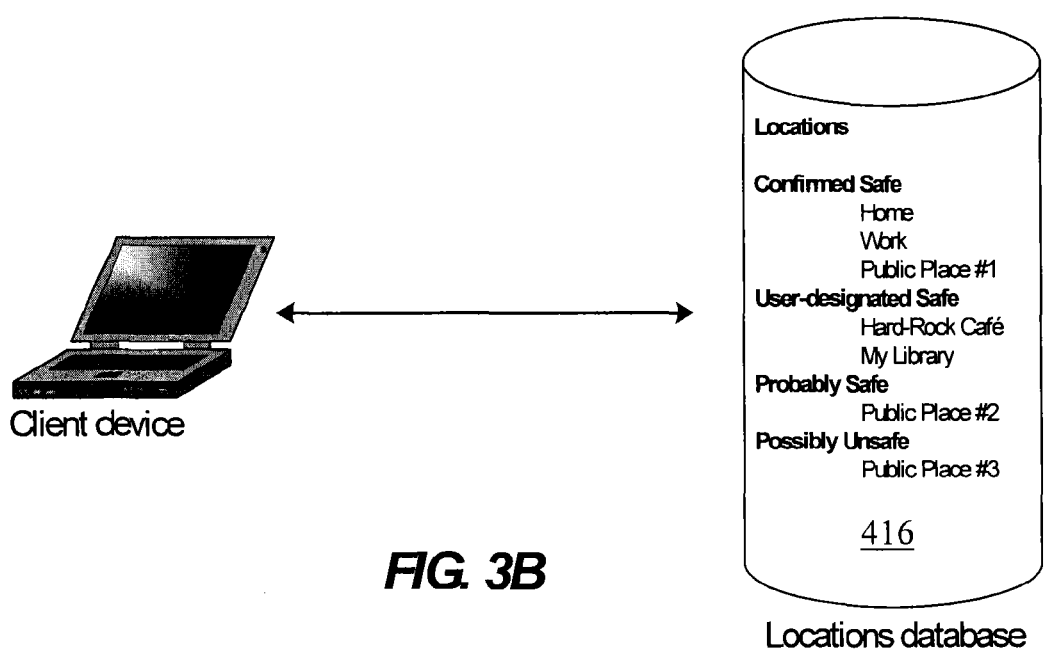
FIG. 3B illustrates an example of a location profile database according to one embodiment for use with the security arrangement of FIG. 3A, the database containing records of various places, or geographic locations, that are identified according to their degree of relative safety or danger in terms of security or threat level.

FIG. 3B illustrates an example of location profile database 416 containing records of various places, or geographic locations, that are identified according to their degree of relative safety or danger in terms of security or threat level. For example, certain places that are known to have good network security in place on the servers (such as in the arrangement of FIG. 1A), may be identified as having a "safe" status insofar as a user would be concerned. In one embodiment, the database contains records of places throughout the world. A user copy of the database can be maintained on PID 10, with automatic updates available whenever the client device is in communications with a security system server, which maintains a master (up-to-date) version of the database. Alternatively, security configuration module 410 can access a remote security server to query the location profile database 416. Places stored in the database can be categorized as shown in the embodiment of FIG. 3B: confirmed safe; user-designated safe; probably safe; and possibly unsafe. In another embodiment, combinations of different techniques for determining location of PID 10 may be utilized to confirm a "safe" status and counter attempts at location spoofing and the like. Various other categorizations or designations of safety level may be utilized.

In a related embodiment, the system supports defining conditions under which the safety status may depend. Accordingly, users can make their own assessment of safety based on their observations and on information contained in the database. In another related embodiment, the client device is configured to refresh its database of locations after connecting with the nearest security server running a security application according to embodiments of the invention.

Figure 4:
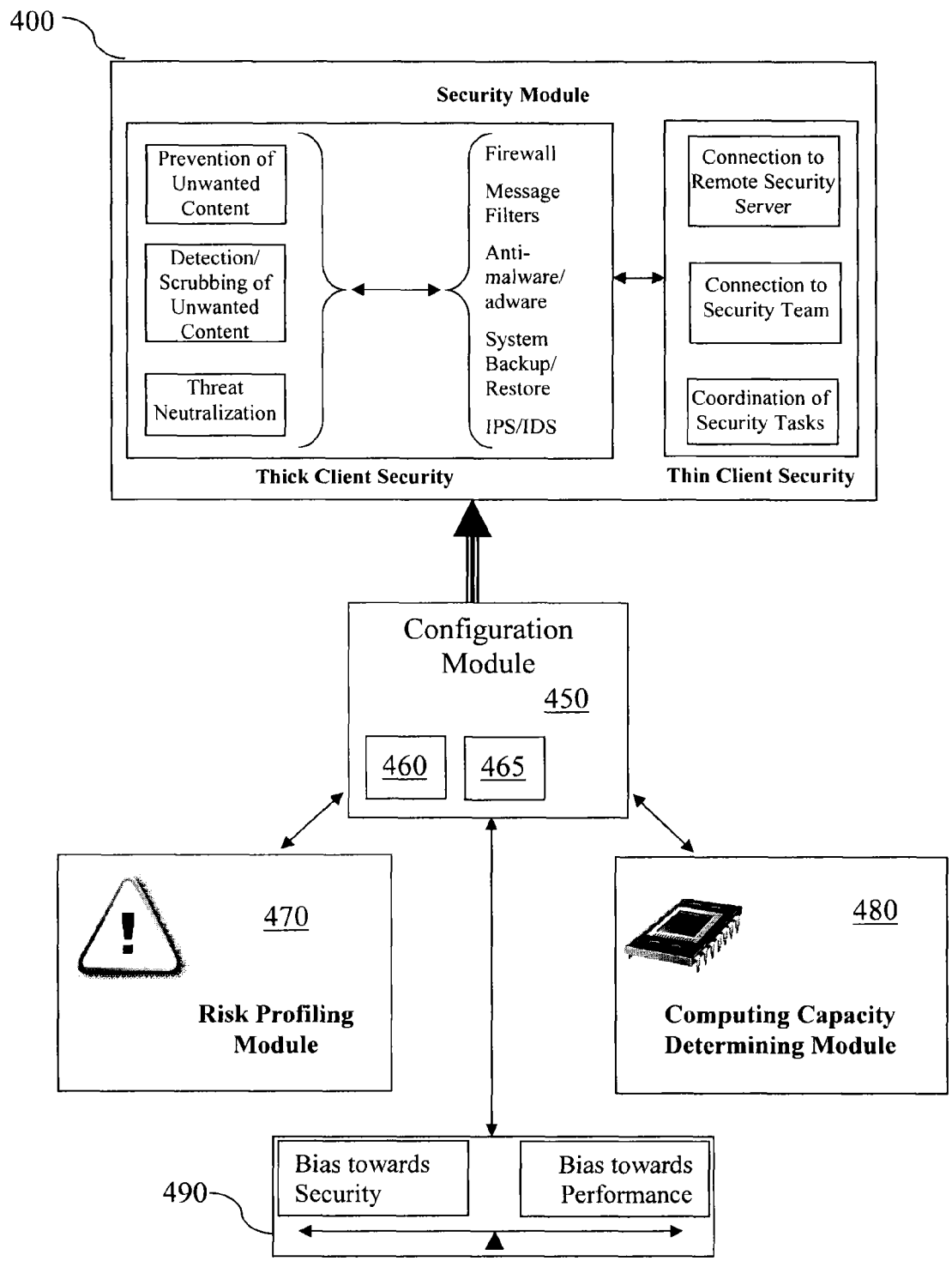
FIG. 4 is a diagram illustrating a security arrangement according to one type of embodiment in which the security module can be automatically configured based on a present security profile for the PID, on the present computing capacity of the PID, or both.

FIG. 4 illustrates a security arrangement according to one type of embodiment in which the security module can be automatically configured based on a present security profile for PID 10, on the present computing capacity of PID 10, or both. The arrangement includes configurable security module 400, described above with reference to FIG. 3A, which can be configured for thin or thick client, or hybrid, modes, and which can have various security functions or components selectively enabled or disabled, or have various operational settings adjusted dynamically. Configuration or adjustment of security module 400 is performed by security configuration module 450, which can be locally present in PID 10 together with security module 400, or which can exist remotely from PID 10 and access security module over a network.

Security configuration module 450 includes configuration determining module 460 and configuration setting module 465. Configuration determining module 460 includes decision criteria that read and process input from at least one of risk profiling module 470, computing capacity determining module 480, and user input module 490, to determine which configuration or operational settings are suitable to be set for security module 400. Configuration setting module 465, in turn, sets the determined configuration or operational settings in security module 400.

In one embodiment, configuration determining module 460 and configuration setting module 465 of security configuration module 450 configure the operational settings of security module 400 with a goal of reducing computational load on the computer circuitry presented by operation of configurable security module 400, while maintaining a level of security to protect against present security risks, as determined by the security configuration module based on the input from risk profiling module 470.

In one such approach, configuration determining module 460 maintains a hierarchy of security-related functionality available in security module 400. The hierarchy of security-related functionality is ordered according to a current set of security risks, as determined by risk profiling module 470. Thus, in this embodiment, the hierarchical arrangement is dynamic; whereas in more basic embodiments, static hierarchical arrangements of security-related functionality can be used. The hierarchy is ordered in terms of essentiality of functionality needed to protect against the current set of security risks. For example, for PID 10 running a web browser program but not an email client program, firewall and anti-malware/adware functions are more essential to maintaining protection from likely security threats than, for example, message filtering functions.

In a related embodiment, essentiality of functionality is ranked in terms of finer granularity, where operational settings for each class of security-related functionality can be varied. For example, the anti-malware/adware function can be tuned to protect against particular threats associated with applications that are currently being executed in PID 10, to the exclusion of providing a broader spectrum of protection against all known threats.

In one embodiment, configuration determining module 460 derives or selects the hierarchical order of security-related functionality in response to the current set of security risks from risk profiling module 470, and further selects, from among the hierarchy, a subset of more essential functionality based on the current computing capacity, as determined by computing capacity module 480. Thus, with greater available computing capacity, more security functionality is generally provided; however, under conditions of reduced computing capacity, security is limited to only essential features. Accordingly, security is limited intelligently and dynamically based on the circumstances, resulting in configuration setting module 465 setting the configuration of operational settings for security module 400, such that a computational load on the computer circuitry attributable to operation of security module 400 is reduced while the subset of more essential security-related functionality is provided, thereby facilitating usability of PID 10 while providing security protection for PID 10 corresponding to the current set of security risks.

In a related example, as computing capacity progressively becomes reduced, as would be the case when the battery of PID 10 becomes drained with use, configuration setting module 465 progressively disables security-related functionality in order of less essential functionality to more essential functionality to preserve computing capacity for non-security functions of PID 10.

Figure 5A:
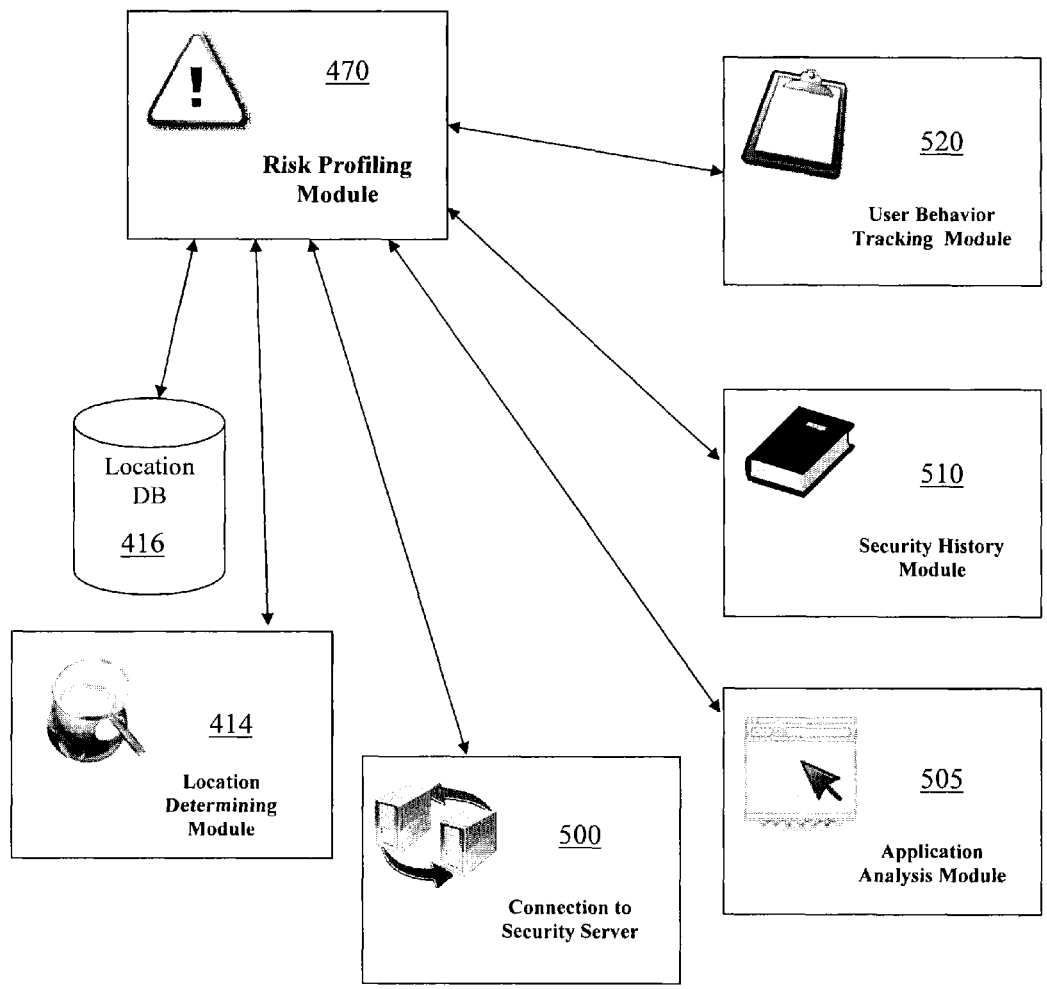
FIG. 5A illustrates an example arrangement of a risk profiling module of the security arrangement of FIG. 4, according to one embodiment.

Risk profiling module 470, in various embodiments, obtains information from which it ascertains a present risk profile. FIG. 5A illustrates an example in which risk profiling module 470 interfaces with several different sources of risk-related information. In the example shown, risk profiling module 470 communicates with location determining module 414 and location database 416 (both of which have been described above) to obtain information about the present location and determine the corresponding level of security associated with the present location. Risk profiling module 470 in this example also interfaces with security server connection module 500, which enables risk profiling module 470 to obtain security-related information over the network. Examples of such information include information about the general threat level and, when used in conjunction with location determining module 414, the threat level specific to the present location.

Risk profiling module 470 assesses, and re-assesses a current set of security risks to which PID 10 is exposed. In one arrangement, risk profiling module 470 performs re-assessment periodically, such as on a certain predetermined time interval. In another arrangement, the re-assessment is performed in response to occurrence of certain events relevant to risk profiling, such as upon the opening of a new application instance, for example. In a related embodiment, re-assessment is performed both, periodically, and in response to events. In this type of embodiment, certain indicia of risk are re-assessed periodically, such as a present threat level indication, which does not tend to change frequently; while other indicia of security risk, such as network traffic volume, for instance, tends to change abruptly based on changes in operating modes or applications running on PID 10.

Application analysis module 505, in one embodiment, examines the registry of the operating system of PID 10 to determine which applications are installed on the device. From this information, risk profiling module 470, in conjunction with application analysis module 505, can determine specific vulnerabilities of PID 10. An application such as a Web browser would have a different vulnerability profile than an email application, or a spreadsheet, for example. In a related embodiment, application analysis module 505 examines applications that are presently active, which is a narrower subset than all of the installed applications. Accordingly, in one embodiment, the risk profile indication can vary as a function of time, depending on which applications are in use at the present instant.

Security history module 510 provides information about recent security-related occurrences that may reflect a present threat level. For example, if the firewall has been detecting a higher-than-normal frequency of attempts to access PID 10 by unknown devices, this may be an indicator of an increased risk of intrusion. Event history can also be associated with location information, such that different locations may have different relevant histories. Accordingly, if the user carries PID 10 to a new location, the relevant history for that location would be examined.

User behavior tracking module 520 operates to track user behavior in order to update the risk profile, which is in turn used to adjust the configuration of configurable security module 400. User behavior tracking is applicable to embodiments in which configurable security module 400 operates in a thick client mode fully independent of any remote computing device, in embodiments where configurable security module 400 operates in a thin client or hybrid mode in conjunction with a security server, and in embodiments in which configurable security module 400 operates in a distributed security sharing team processing mode.

Figure 5B:
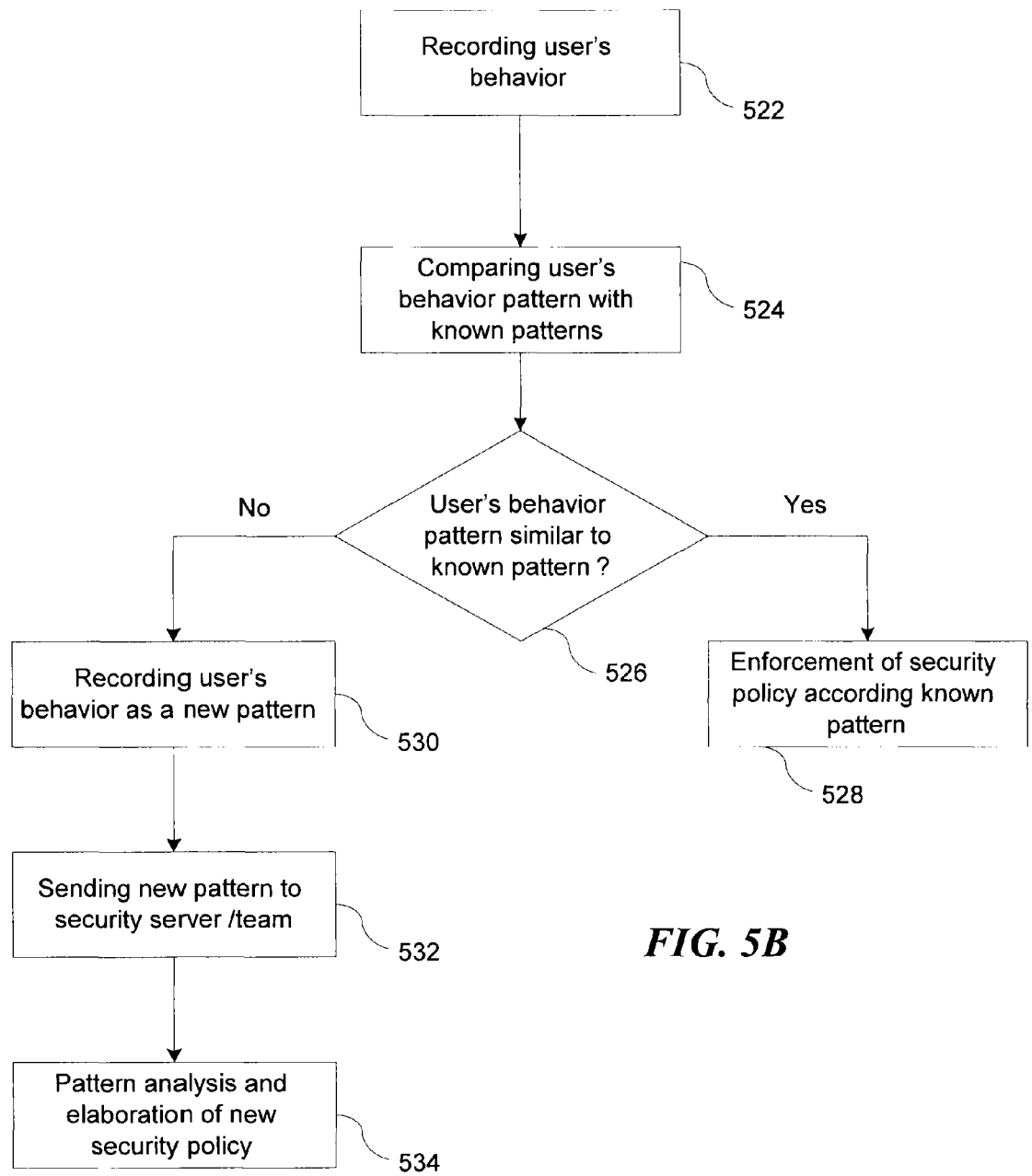
FIG. 5B illustrates an example process performed by a user behavior tracking module according to one embodiment.

FIG. 5B illustrates an example process performed by user behavior tracking module 520 according to one embodiment. At 522, user behavior tracking module 520 tracks and records the user's behavior. Tracked actions may include conventional logs that are produced by the operating system and applications, such as those produced by antivirus functions of configurable security system 400 (e.g., called system functions use of shared libraries, etc.) and logs of simpler actions (e.g., launching of the browser application, opening of Web pages, starting of an email client application, starting of an instant messaging (IM) client, etc.).

Starting from a certain point in time when the usage tracking process has determined that the user has made a sufficient number of actions, a process of comparing the user's tracked behavior with previously defined behavior patterns, as indicated at 524. In one embodiment, the previously defined behavior patterns are stored in the form of user behavior templates. FIG. 5C illustrates several examples of behavior templates according to one embodiment.

In one embodiment, the user behavior templates include a criteria or threshold that must be met for a usage pattern to be considered as matching the template. This embodiment requires that the user perform a sufficient number of actions or transactions on the PID 10 before the situation can be considered a pattern of behavior that should affect the risk profiling or otherwise trigger special configuration of the configurable security module 400. If the decision at 526 matches any of the known usage patterns of user behavior templates, a corresponding security policy is enabled, as indicated at 528. For instance, in the event that user behavior matches template 10042 (corresponding to repeated download activity), configurable security module 400 can be configured to change settings of the firewall to enable more aggressive screening. Also, intrusion prevention can be enabled that specially screens all downloaded files in an isolated sandbox before access may be granted to the file. In the absence of the identified usage pattern that identifies a particular increased risk, configurable security module 400 may not have certain protective measures enabled.

If the decision at 526 indicates that a particular usage sequence is not matched to a known pattern or template, that sequence may nevertheless be a cause for concern. In one example embodiment, behavior monitoring at 522 applies logic for detecting and flagging repeated activities or activities that are of interest based on a set of predetermined criteria. In this embodiment, a repeated activity might constitute an increased risk; however, in an absence of a known pattern or template, user behavior tracking module 520 may not be able to recognize it as such. Accordingly, at 530, the usage pattern detected as being a repeated pattern or a pattern of interest is recorded as a new usage pattern and, if configurable security module 400 is operating in a thin client or hybrid mode in which interaction with an outside processor is utilized, the new usage pattern is sent, at 532, to either a security server, or to team members, as the case may be, for further analysis at 534. The security server or security sharing team of devices can analyze the new pattern to see if it matches similar patterns from other users, or if the same user has a history of engaging in that pattern of usage. Also, the security server, or a sufficiently capable device on a security sharing team of devices, can perform a more in-depth analysis to determine whether the detected usage pattern presents a particular risk or vulnerability. In response, a new known usage pattern, or a new usage template can be generated and distributed to PID 10, and to other devices on its security sharing team, if appropriate.

Referring again to FIG. 4, computing capacity determining module 480 provides information about the system performance of PID 10 for use by security configuration module 450. This type of information enables security configuration module 450 to select an appropriate configuration for configurable security module 400 so that system performance is not unduly burdened by operation of the security system. In one type of embodiment, computing capacity information provided by computing capacity determining module 480 is considered in conjunction with the risk profile information by security configuration module 450 to achieve a proper balance between performance needs and security needs for PID 10.

Computing capacity determining module 480 assesses, and re-assesses a current state of computing capacity availability of PID 10. In one arrangement, computing capacity determining module 480 performs re-assessment periodically, such as on a certain predetermined time interval. In another arrangement, the re-assessment is performed in response to occurrence of certain events relevant to computing capacity, such as upon the opening of a new application instance, for example. In a related embodiment, re-assessment is performed both, periodically, and in response to events. In this type of embodiment, certain indicia of computing capacity are re-assessed periodically, such as battery capacity, which does not tend to change abruptly; while other indicia of computing capacity, such as available memory, for instance, tends to change abruptly based on changes in operating modes or applications running on PID 10.

Figure 6A:
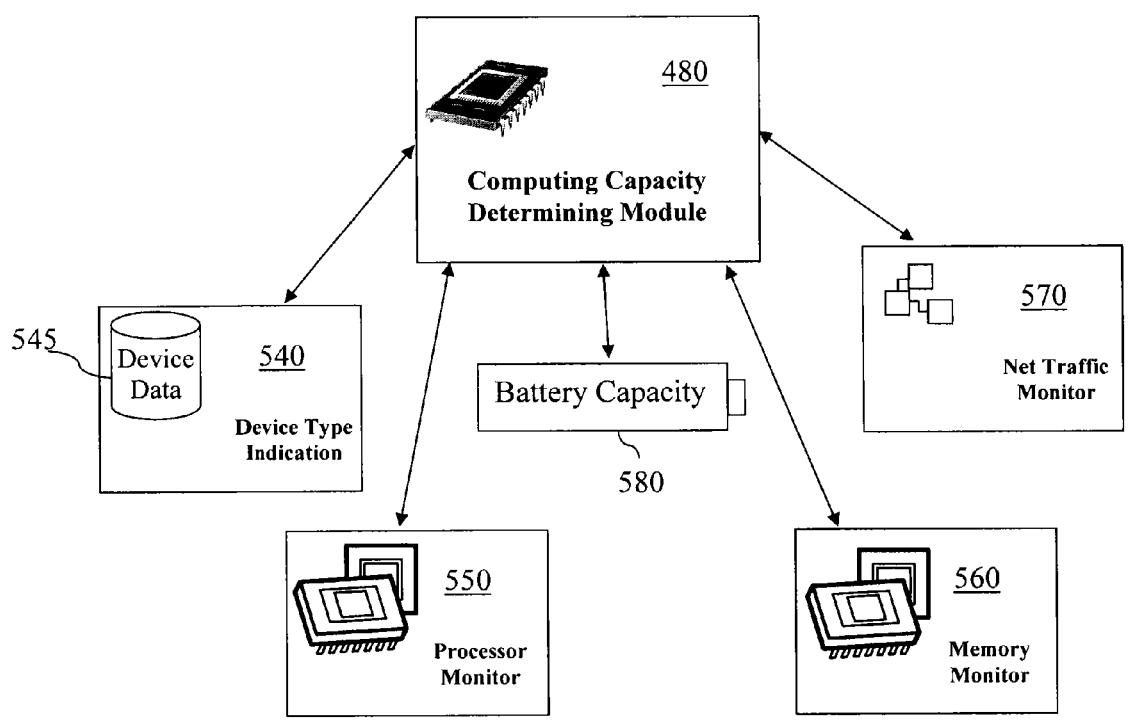
FIG. 6A illustrates an example arrangement of a computing capacity determining module of the security arrangement of FIG. 4, according to one embodiment.

FIG. 6A illustrates several examples of the types of inputs received by computing capacity determining module 480 in one example embodiment. Input 540 is an indicator of the type of device that is PID 10. Computing capacity determining module 480 can also access device information database 545, which may reside locally or remotely from PID 10, and which contains performance measures of classifications of various types of devices. Since the device type can be a static item of information in many cases, this information may be determined during installation of the security arrangement onto PID 10. FIG. 6B is a table illustrating an example set of data contained in device information database 545. The display size, processor type, data store type and size, battery capacity, and communications provisions facilitate estimation of each device's performance characteristics, including the rate of battery drain.

Another example of data in device information database is information that is produced by the Systeminfo utility for Windows XP by Microsoft Corporation.

FIG. 6C is another embodiment of a set of data contained in device information database 545, in which a predetermined performance score or rating is given to each type of device. Based on the performance rating, a particular configuration type may be determined, as illustrated in FIG. 6D. The configuration types shown in FIG. 6D can be established during installation of the security arrangement, during an update of the installation, or dynamically, according to various embodiments. A dynamically-configurable embodiment may be suitable in cases where upgradeability or expansion is possible, such as in devices facilitation expansion memory card slots (micro SD, for instance), or for devices for which higher-capacity batteries can be installed by the user.

Referring again to FIG. 6A, processor monitor 550 provides indicia of the load on the processor of PID 10, and provides a corresponding input to security configuration module 450. In one embodiment, processor monitor 550 measures the ratio of time in which the processor is in an idling state. For example, some processors utilize a reduced clock speed mode such as the Speedstep® feature by Intel Corporation or the Cool 'n Quiet™ feature by AMD Inc. during their idling state. Operation in these modes can be monitored and utilized in embodiments of the invention as a measure of processor load. Processor load is one type of indicator of the intensity of use that PID 10 is experiencing. This information is useful in determining the ability of PID 10 to handle running security module 400 in addition to the other applications that account for the loading on the processor. In similar fashion, memory monitor 560 monitors memory allocation, which is another measure of system load and capacity for running security module 400, and provides a corresponding input to security configuration module 450. In situations where the load on processor and memory resources of PID 10 is relatively higher, configuration module may temporarily configure security module 400 with a reduced functionality (if doing so is not inconsistent with the security needs in view of the current risk profile and user-specified tolerances).

Network traffic volume monitor 570 provides an input to security configuration module 450 indicating the present status of network traffic into, and out of, PID 10. Incoming and outgoing network traffic are informative as to the nature of the current use of PID 10. As a direct measure, the network traffic volume indicates available communications bandwidth that may be needed for certain types of configurations of security module 400. As an indirect measure, the network traffic volume, and the predominant direction of data flow, and the ratio of incoming to outgoing data volumes, collectively, are indicative of the user's intensity of use and corresponding needs for device performance. Security configuration module 450, in one embodiment, considers the input from network traffic volume monitor 570 as part of determining whether to configure security module 400 to operate in thin or thick client modes, the former requiring more communication bandwidth than the latter.

Battery capacity indication 580 provides battery status information to security configuration module 450. Battery status is informative of computing capacity limitations because, even though the processor, memory and communications bandwidth may be sufficient to support a robust security configuration, the computing load of the security module in that configuration would be more power-intensive. A situation in which there are limited energy reserves in PID 10 may dictate configuring security module 400 in a reduced load operating mode.

Referring again to FIG. 4, security configuration module 450 can further receive an input from user input module 490, which enables the user of PID 10 to provide his or her preferences to be taken into consideration in configuring security module 400. In one embodiment, user input module 490 provides, via the user interface, a slider or other intuitive control operable by the user, with which the user can select a bias towards security, or a bias towards performance. For instance, in a situation where a user needs to browse the Web with particular urgency at a given moment, or run a graphics-intensive application smoothly, the user can set the slider control with a bias towards performance. In a related embodiment, user input module 490 provides a user control to facilitate selectively shutting down other background programs in addition to the security components that may be shut down to favor performance. In another situation, where the user intends to access personal or financial information, the user could set the slider control indicating a bias towards security.

Aspects of the invention contemplate that security configuration module can be programmed with any suitable decision logic for determining configuration settings for security module 400 based on the variety of inputs that it receives. Moreover, the decision logic may be selected or formulaically derived based on the device type. For example, a smartphone device with fewer computing resources and less communication bandwidth could have a decision profile that favors more aggressive responsiveness biased toward preserving performance, than a netbook-type device that has a more capable processor and more memory.

Different types of devices can also be configured to respond in different ways to similar situational circumstances. For instance, in a situation where the inputs to security configuration module 450 suggest reducing the computational load attributable to security module 400, Device A may preferentially migrate from a thick client configuration to a thin client configuration, as an initial response to the situation; whereas Device B may preferentially reduce functionality of security module 400 while security module 400 remains in a thick client mode.

In one type of embodiment, security configuration module 450 is programmed to balance the needs of preserving performance PID 10 while providing an adequate level of protection from security risks by computing a performance-risk vector from multi-variable inputs representing the security risk profile, as well as the computing capacity, and user input settings. Each variable of the multi-variable inputs can have a different weight assigned to it such that the corresponding input is given greater emphasis in the formula. In one example embodiment, some of the variables are weighted in the following order (from greatest to least weight):

Battery depletion;
User Preference;
Location;
Active Applications;
Network traffic; and
Current overall threat level.

Figure 7A:
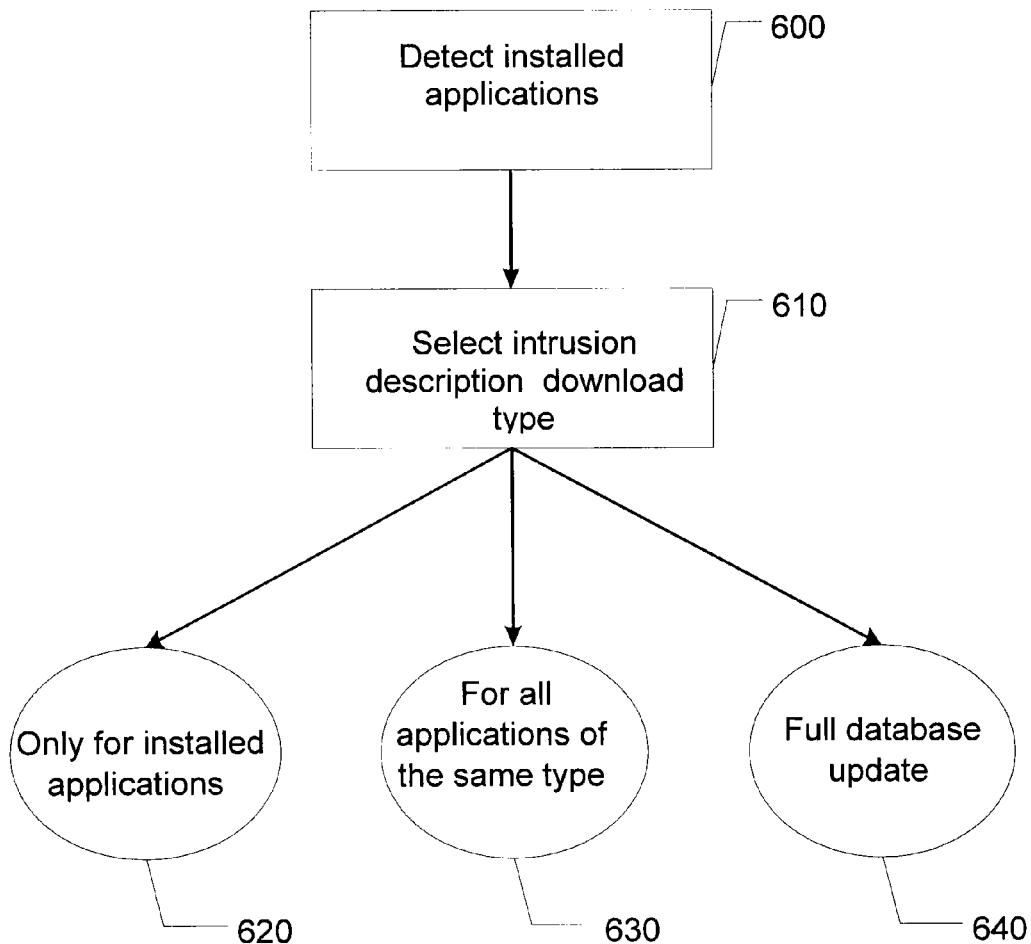
FIG. 7A is a flow diagram illustrating a decision process for determining the type of security threats database update that is to be performed according to one embodiment.

In another example of how security configuration module 450 can utilize inputs from risk profiling module 470 in conjunction with computing capacity determining module 480, FIG. 7A illustrates a decision process for determining the type of security threats database update that is to be performed according to one embodiment. At 600, application analysis module 505 detects the installed applications present on PID 10. Based on this list, at 610, application analysis module 505 selects from among three update options: option 620 would configure the threats database with updated threat descriptions for only the installed applications. Option 630 would configure the database to include descriptions of threats associated with the installed applications, plus additional threats that are associated with application programs having similar characteristics. For instance, in the case of Mozilla Firefox being an installed application, Option 630 would update the threat descriptions database with threats associated with Web browser programs in general. Option 640 would achieve a full configuration with all known threat definitions, as in a conventional security arrangement that does not include provisions for reducing its overall functionality. In one embodiment, selection from among the three options is based on the computing capacity as determined by computing capacity determining module 480, based on processor and memory capability and, optionally, as well as on current load conditions. In a related embodiment, the present battery life can be a factor in what type of updating is performed.

Figure 7B:
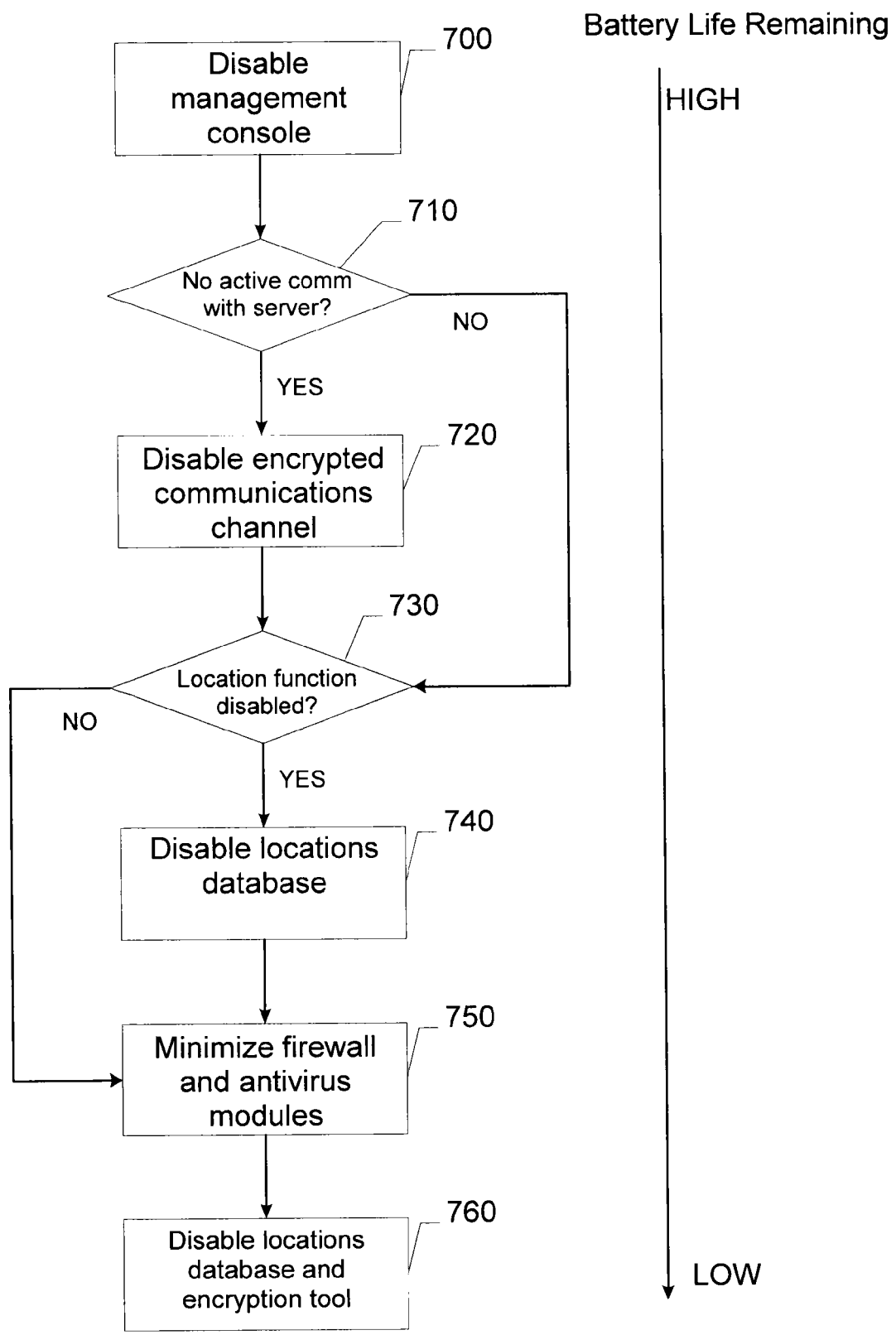
FIG. 7B is a flow diagram illustrating a simple example of how various security configurations can be selected as a function of remaining battery life according to one embodiment.

FIG. 7B is a flow diagram illustrating a simple example of how various security configurations can be selected as a function of battery life remaining. As the remaining battery life decreases from high to low with use of PID 10, the illustrated process is followed in sequence. In general, non-essential security functions are disabled first, and more essential security functions are disabled last. In the example of FIG. 7A, a management console of the security system running on PID 10 is disabled first at 700. Since the management console is simply a user interface and does not itself perform security functions, it constitutes a load on system resources that is simply overhead.

At 710, the system determines whether there is any active communications with a remote security server. If there are active communications, that indicates the security module is operating in a configuration that relies on security server to some extent. In this case, disabling the encrypted communications channel that facilitates the connection to the server at 720 is skipped. If, on the other hand, the security module is not actively communicating with the security server, then the encryption modules can be disabled at 720. At 730, the system checks whether or not the location determining function is operational. If it is operational (i.e. not disabled), the related functionality of management of the locations database is left operational to support the location-based configurability functionality. If the location determining function is unused, the location database and any other related functionality is disabled at 740.

At 750, as the battery becomes further depleted, the firewall and antivirus functions are progressively minimized. One example of progressive minimization is described above with reference to FIG. 5, where the threat descriptions database is reduced to spend fewer system resources on addressing security risks that are less likely. Focusing on only those risks that are most pertinent to the present types of applications, or on only those particular applications installed on PID 10, provides a more efficient utilization of system resources spent on security.

As the battery continues to be drained further, the location determining and responding functions, and the communications functions are disabled at 760 to preserve system resources for only the most essential firewall and malware functions. At some point, a judgment would need to be exercised as to whether to disable security functions altogether so as to preserve system resources for only the applications being run, or whether the risk of operating the applications on PID 10 without any security is unacceptable. Accordingly, in one embodiment, when the battery reaches a critically low level, say, 10%, for example, the device prompts the user to authorize unsecured operation. In a related embodiment, user notifications are given at different stages of security system disablement, thereby giving the user the ability to adjust the behavior of resource management of PID 10.

Referring again to FIG. 3A and FIG. 4, the team-assisted security functionality aspect of the invention, in one type of team-assisted security mode, PID 10 utilizes configuration module 410 or configuration module 450 described above to configure configurable security module 400 in a thin client or hybrid mode in which certain ones of the security functions or components operating for the benefit of PID 10 are actually processed on one or more portable devices other than PID 10, with data exchange between the one or more mobile devices being facilitated via security team connection module 407. In a related embodiment, the one or more devices of the team to which security-related processing of PID 10 is distributed are selected from a predetermined group of trusted devices.

This distributed mode of security functionality processing for the benefit of PID 10 can be selectively entered into by PID 10 based on various circumstances or inputs, such as those described above upon which the selection of a thin client, thick client, or hybrid mode of operation for configurable security module 400 is based. In addition, embodiments of this aspect of the invention utilize task coordinating module 408, or configuration modules 410 or 450, for selecting which security functions or components are to be distributed to the security sharing team (versus being processed locally in PID 10), and for assigning certain security functions or components to specific security sharing team members.

Accordingly, task coordinating module 408, or configuration modules 410 or 450, in various embodiments, configure security module 400 for team-distributed security operation based on factors such as current computing capacity of PID 10, current risk profile of PID 10, the location of PID 10. In one such embodiment, task coordinating module 408, or configuration modules 410 or 450, also take into account the current state of the security sharing team of devices (including current team membership, computing capacity of individual team members, risk profiles of individual team members, and the location of individual team members).

Figure 8A:
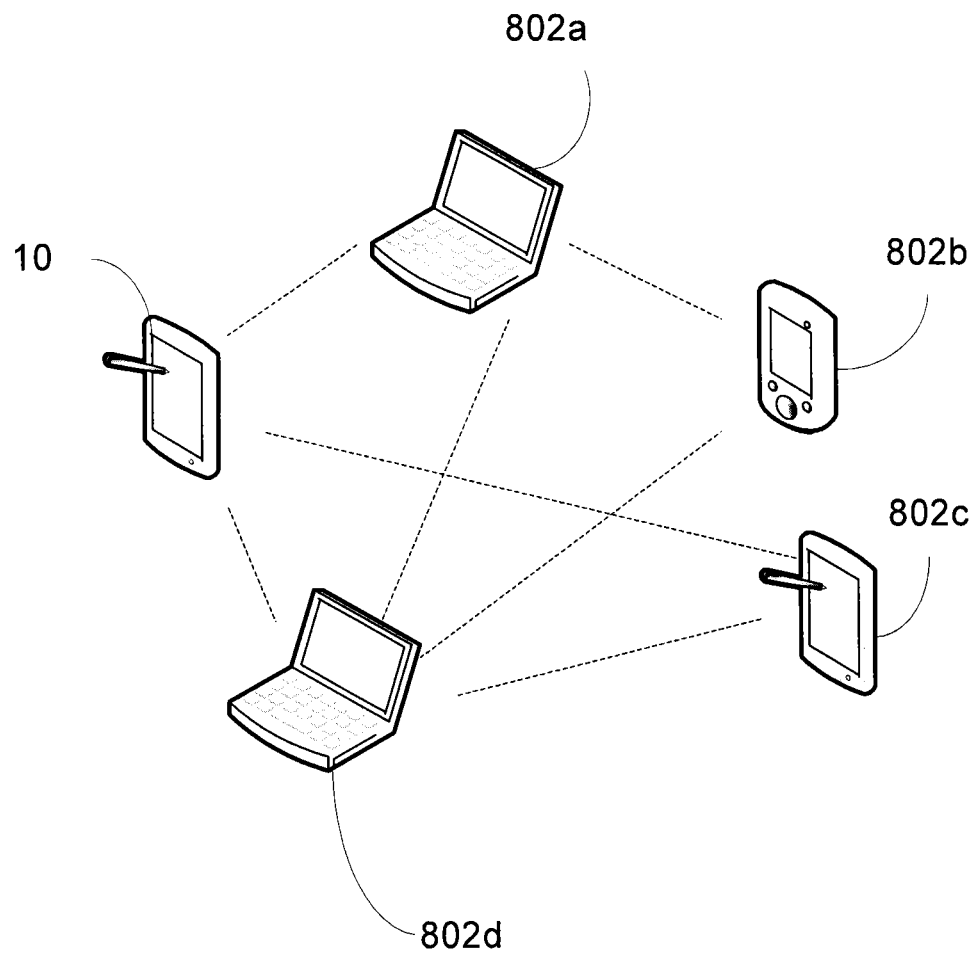
FIG. 8A illustrates an example arrangement of a security sharing team of portable devices that are communicatively coupled to the PID of FIG. 1A according to one aspect of the invention.

FIG. 8A illustrates an example arrangement of a security sharing team of portable devices 802*a*-802*e* that are communicatively coupled to PID 10. In the embodiment depicted in FIG. 8A, security team connection module 407 establishes and operates a multi-hop peer-to-peer network topology, such as a mesh network topology. In other embodiments, various other network topologies are utilized. Examples include hub-and-spoke (i.e. single hop), tree (i.e. root-branch hierarchy), cell-based (i.e. with interconnected cell master units). In one type of embodiment, security team connection module 407 selects from among a set of different networking techniques, as appropriate under the prevailing circumstances. It will be recognized by persons of skill in the art that any suitable topology may be used. Interconnectivity between devices 802*a*-*d* and PID 10 can be achieved using Wi-Fi, Bluetooth, or any other practical wireless physical communication technology. In a related embodiment, an encrypted tunnel, such as the one described above with reference to FIG. 2E, is used by security team connection module 407 to facilitate secure communications between PID 10 and the other devices on the security sharing team.

Figure 8B:
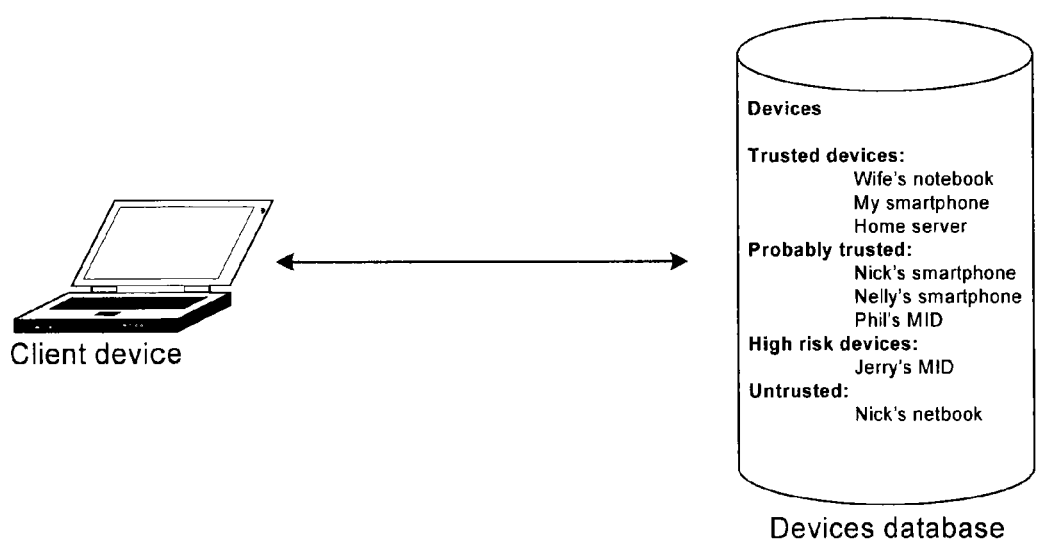
FIG. 8B illustrates an example of a membership list in the form of a devices database maintained by the PID any of the other devices depicted in FIG. 8A.

For PID 10 and portable devices 802*a*-802*d*, devices join a security sharing team based on predefined membership lists. FIG. 8B illustrates an example of a membership list in the form of a devices database maintained by PID 10 or by any of the other devices 802*a*-802*d*. The membership list in this example includes four classes of devices: trusted devices, probably trusted devices, high risk devices, and un-trusted devices. Depending on the configuration of the security module, and on what security-functionality is to be distributed to, or assisted by, the team, the set of devices deemed suitable with which to connect can have devices from different classes such that in some configurations, only trusted devices are deemed acceptable, whereas in other configurations probably trusted devices, or even high risk devices can be connected with in addition to the trusted devices.

In a related embodiment, the devices database includes dynamic information about each listed device. The dynamic information includes information that changes over time. This information can be updated in real-time, periodically at certain intervals, or otherwise in the course of discovery of nearby devices. FIG. 8C illustrates one such example. The device ID can be based on a device serial number (S/N), MAC address, or other such hard-coded indicators, or an indicator that is preferably difficult or impossible to change through programming. In various embodiments, either one, or both, of the current risk profile information or the current computing capacity information can constitute a standard numerical measure of risk or computing capacity (as exemplified in FIG. 8C for the computing capacity), a code that represents multiple parameters of risk profile or computing capacity information (as exemplified in FIG. 8C for the risk profile), a pointer to a standard lookup table entry in which multiple parameters of risk profile or computing capacity information can be valued, or the risk/computing capacity information itself, such as in the form of XML data. Other embodiments can use any variety of suitable formats in which the data can be represented.

Figure 8D:
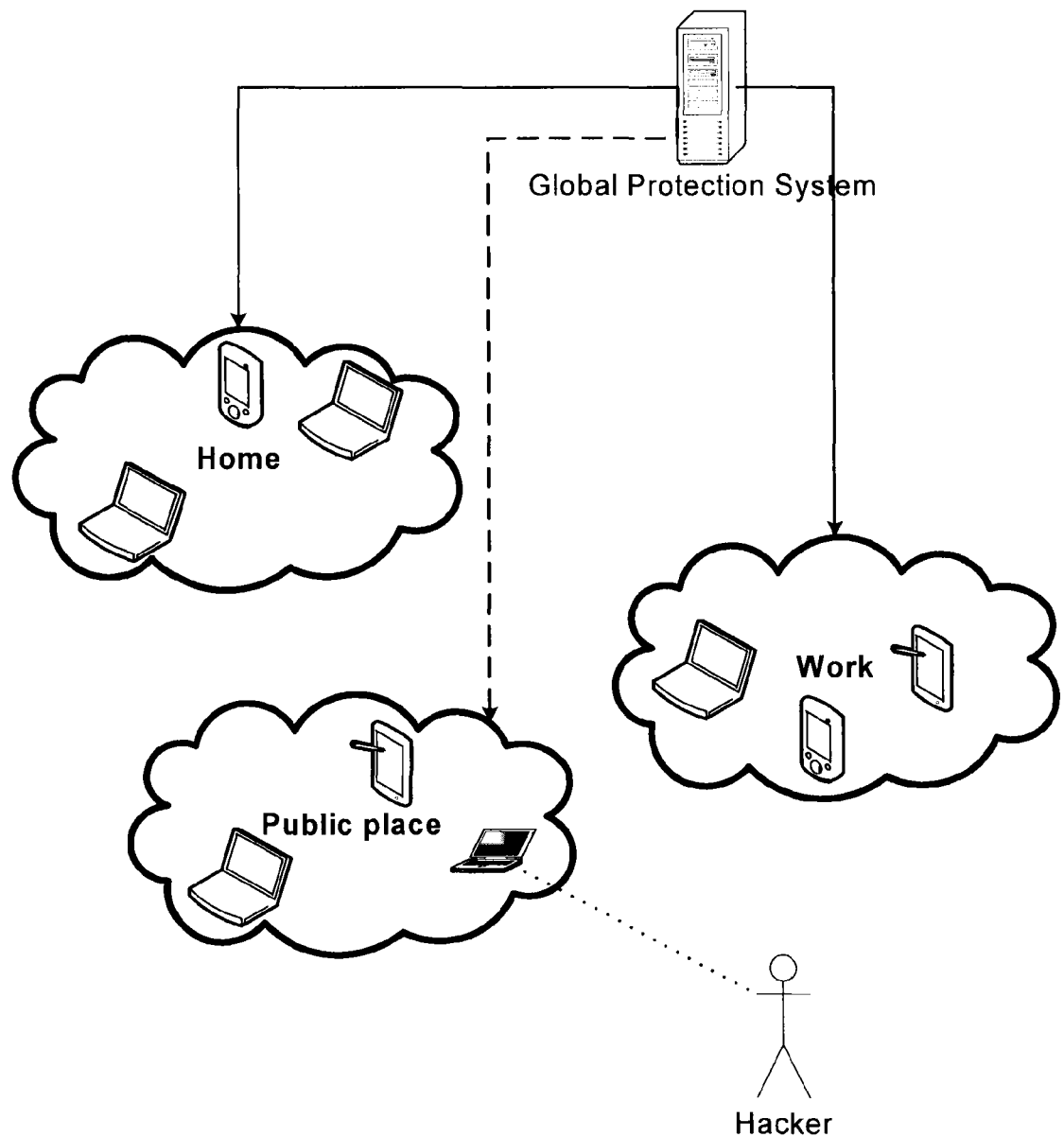
FIG. 8D illustrates different portable devices at different locations that can constitute potential security sharing team members.

The list of devices can be user-defined based on previously known devices. Workgroups of users can also automatically create a team definition based on planned group activity, such as conference attendance or travel together. Security sharing team membership can also be based on the location of PID 10. For instance, as illustrated in FIG. 8D, different portable devices at different locations can constitute potential security sharing team members. Thus, for example, devices that are authorized in PID 10 as potential security sharing team members at work may not be authorized as security sharing team members at home. The list of potential devices may be further limited for public places.

In one type of arrangement, a security sharing team can be composed of devices that are located at different geographic locations. For example, a device that is at home may be in a security sharing team that includes devices at work or elsewhere. In this example, connectivity with the devices at different locations is achieved through a wide area network, such as the Internet. In a related embodiment, the Global Protection System, or security server, has a role in coordinating the connectivity and processing distribution for the security sharing team of mobile devices, including coordinating team membership (i.e., devices joining or leaving the team, and task distribution of how specific processes are distributed to certain team member devices).

In another type of embodiment, a security sharing team includes portable infrastructure devices that are used primarily for facilitating networking or other services, and not primarily user interface devices like smartphones, PDAs, netbooks, and the like. One such device is a portable Wi-Fi hotspot, such as a MiFi, manufactured by Novatel, which bridges a Wi-Fi private network and a mobile 3G network. Other infrastructure devices include Wi-Fi extenders, and the like. These devices are designed to be carried from place to place by a user, but are not PID devices per se that originate and consume information on behalf of a user. They do, however, have some processing capability and, in the case of battery-powered devices, are not burdened with the energy demands of a backlit display, as would be the case with devices primarily designed to interface with users. In this embodiment, a portable infrastructure device is programmed to execute security-related functionality, and is configured like any of portable devices 802a-802d to participate in the security sharing team. In addition, the portable infrastructure device may perform server-like security functionality on behalf of its team, such as firewall and intrusion detection/prevention functionality, and obtaining frequent updates from a remote security server, and relaying those updates to the other team member devices.

The selection by PID 10 of when to distribute security-related processing to security sharing team devices can be based on a variety of factors including indicia specific to PID 10, and indicia specific to available security sharing team devices. For the former, in one embodiment, the same criteria described above that is used to select among thin client, thick client, or hybrid modes, can be used to select security sharing team processing mode. For the latter, risk profile, computing capacity, or both, of devices on the list of potential security sharing team devices can be used, in various embodiments, to select security sharing team processing mode. For example, in one embodiment, security sharing team processing mode is configured in PID 10 only when a certain minimum threshold of computing capacity availability is determined for certain members of the team of devices. In another embodiment, security sharing team processing mode can be selected in lieu of the security server without regard for available computing capacity of other devices.

According to a related embodiment, PID 10 distributes security tasks to other devices on the security sharing team based on several conditions: (a) availability of at least one device from the team, which is ready to perform security tasks for other devices, (b) the computing capacity of the device (or devices) from the team being sufficient to perform the required tasks, (c) the state of computing capacity or user settings of PID 10 lacking the capability, configuration, or user preference, to permit the security tasks to be performed locally on PID 10.

Figure 8E:
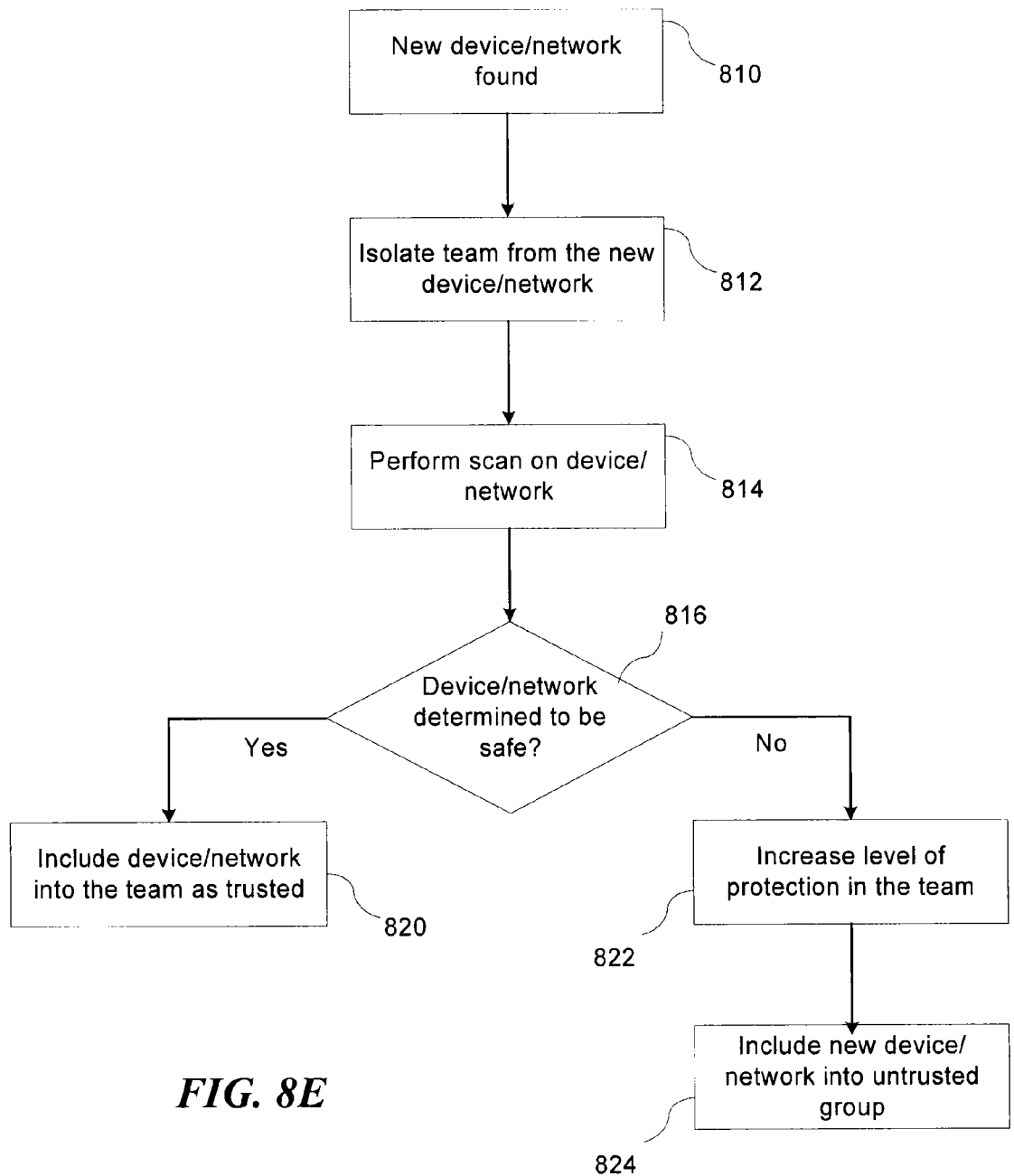
FIG. 8E illustrates an example security reevaluation process according to one embodiment.
Figure 8F:
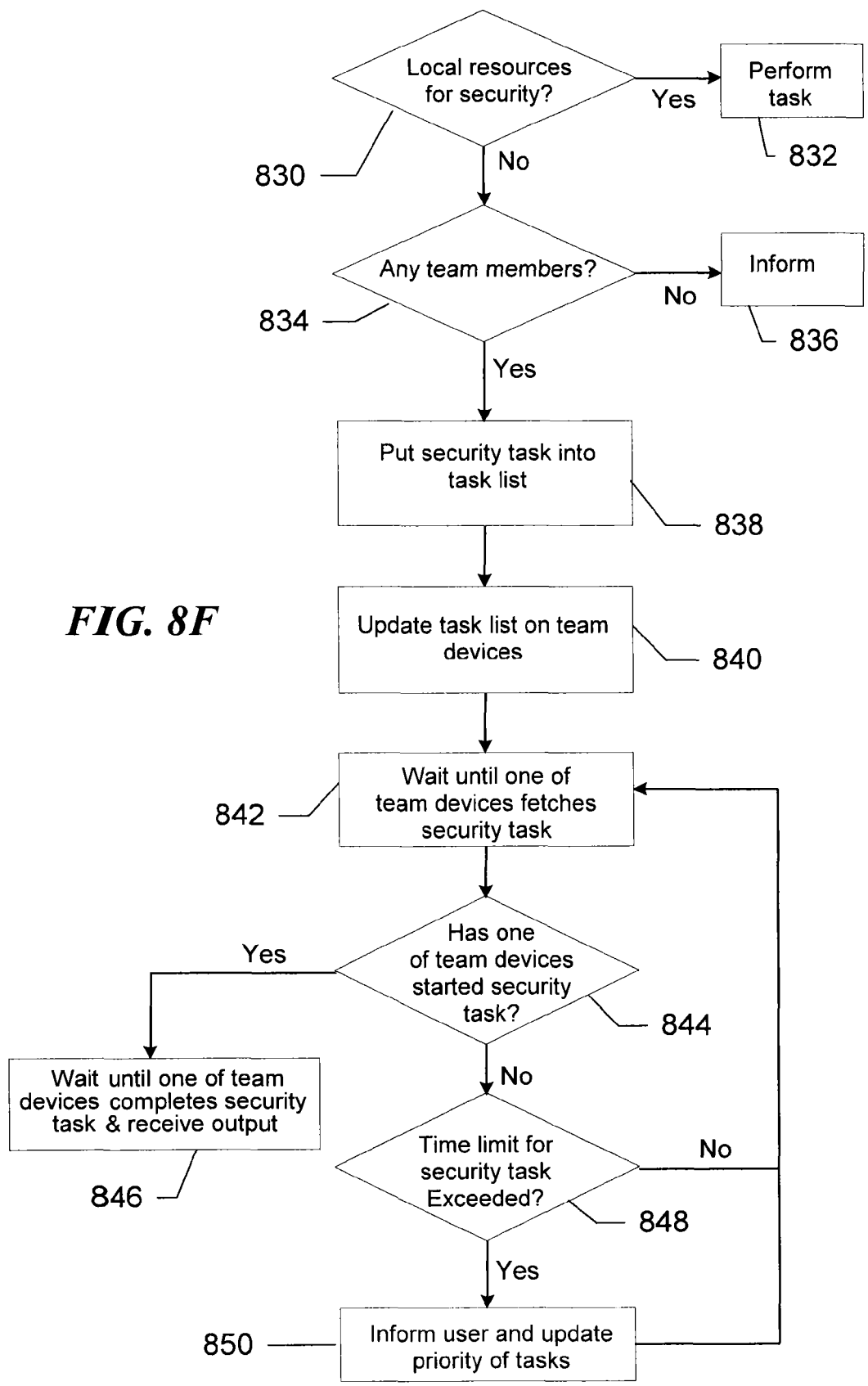
FIG. 8F illustrates an example process of distributing security-related tasks among a security sharing team of devices according to one embodiment.

FIG. 8F illustrates an example process of distributing security-related tasks among a security sharing team of devices. At 830, a device, such as PID 10, in this example, assesses whether it has sufficient local resources to perform local processing of an identified security task. If true, then the task is performed locally at 832. Otherwise, at 834, PID 10 determines whether there are any team members that can perform the task. This can involve a search process in which PID 10 sends out multiple inquiries to neighboring devices, if any. If there are no team members, the user is informed at 836. Otherwise, the process continues by PID 10 distributing the task to the team. At 838, the task is published for the team devices to see. In this example embodiment, PID 10 does not itself select a particular team device (although other embodiments contemplate PID 10 driving this decision). Here, PID 10 simply places the task into a task list that is viewable by other devices. In one type of embodiment, the task list is implemented as a task database, which will be described in greater detail below. At 840, any copies the task list are updated to reflect the new addition to the list. Updating can be accomplished in any variety of ways, such as, for example, broadcasting a message to team devices to download an updated version of the list.

At 842, PID 10 looks for an indication that one of the team devices has fetched the security task. In this example, the team devices arbitrate amongst themselves as to which device is best suited for taking on the security processing. Various factors or parameters that are processed in order to determine which device is most appropriate to take on the task are discussed in the embodiments below. At 844, PID 10 determines whether a team device has started processing the task. This can be accomplished via a message transmitted to PID 10 by the team device taking on the task. In the case where the team device responded affirmatively, PID 10 waits for processing to take place at 846. Following processing, PID 10 receives the output of the security task processing. Otherwise, in the absence of an indication that a team device took on the task (such as by the passage of a certain amount of time without an indication of 844), processing proceeds to decision 848, where PID 10 checks if a predetermined time limit assigned based on a task latency tolerance has passed. If it has not, PID 10 branches to 842 and continues waiting. Otherwise, at 850, the user is informed, and the priority level of the task can be increased.

In addition to the known techniques for setting up an ad hoc network in which the security sharing team members become interconnected, one embodiment further performs a security reevaluation in response to a new device (or network of devices) joining the team. An example security reevaluation process is illustrated in FIG. 8E. At 810, the security reevaluation process is initiated when the ad hoc network established by the security sharing team of portable devices indicates that a new device (or network of devices) that has joined (or is in the process of joining) the security sharing team. At 812, the newly-added device or network is isolated from the others. During this time, the newly-added device or network is not permitted to receive information to be processed from other devices on the security sharing team, and the newly-added device or network is not permitted to send information to the security sharing team to be processed on the device's or network's behalf, except for information necessary to determine that the newly-added device or network can be trusted. At 814, a scan of the newly-added device or network is performed, if necessary. The scan can be performed either by the newly-added device (or the devices of the newly-added network), or over the ad hoc network by one or more of the other security sharing team members, or alternatively, by a remote security server. In situations where no external data was received by the newly-added device or network since the last successful scan, a new scan may not be necessary.

At 816, a decision is made as to whether the newly-added device or network is safe. This can be as simple as a certification or verification that no external data was received by the newly-added device or network, since the last successful scan. In other situations, where a new scan was actually performed, the result of the scan is indicative of the presence or absence of malware or other suspicious content or connections. If the newly-added device or network is determined to be safe, it can be added to the security sharing team as a fully-functioning team member at 820. If, however, the determination at 816 indicates an increased risk associated with the newly-added device or network, the protection level of the security sharing team is increased at 822 before allowing the newly-added device or network to participate in the security sharing team at 824. Increased protection can include more aggressive settings for a firewall or intrusion detection system, or more frequent virus scanning, for example. In a related embodiment, inclusion of the newly-added device or network at 824 can be more limited than the full inclusion of the newly-added device or network at 820. In limited security sharing team participation for the newly-added device or network, some security sharing team functions, but not others, are allowed.

In one type of embodiment, task coordinating module 408 includes instructions for how the distribution of security-related processing is performed. Generally speaking, any suitable technique for controlling the distributed processing can be used within the spirit and scope of the invention. In one type of embodiment, for example, techniques are used such as those described in A. R. K. Sastry, "Distributed Processing in Multi-Hop Packet Radio Networks," Rockwell International Final report under contract DAAL03-89-C-0017 (Army Research Office), August 1991, incorporated by reference herein in its entirety.

Figures 9A, 9B:
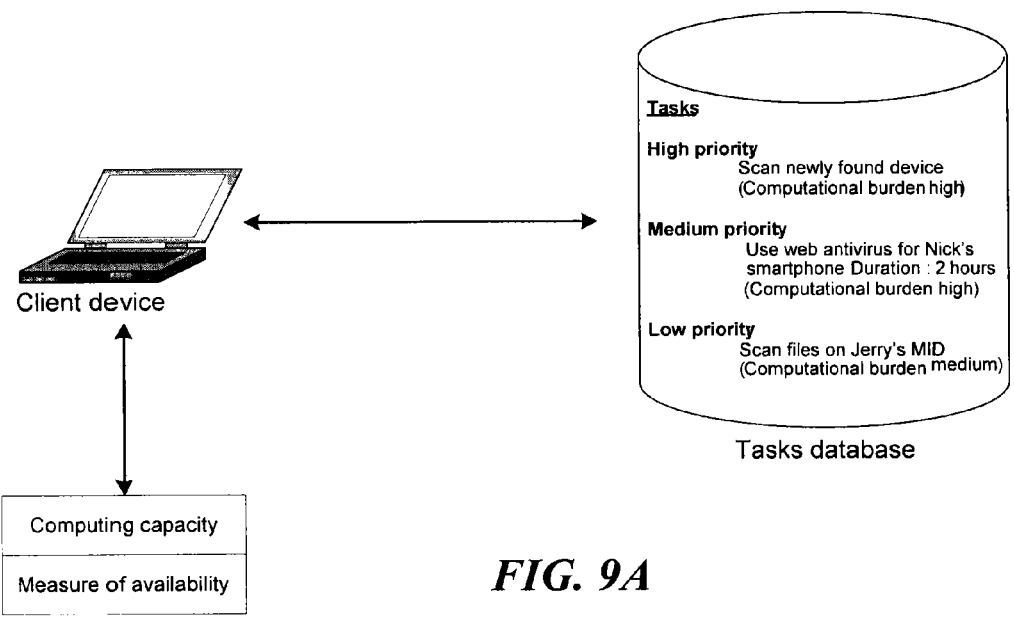
FIG. 9A illustrates an example task database used for team security sharing according to one embodiment.
FIG. 9B illustrates various load level classifications associated with required computing capacity and measures of availability according to one example embodiment.

In one type of embodiment, task coordinating module 408 maintains a task database that contains a list of security-related tasks that are to be performed for either individual devices of the team, for the team as a whole, or both. FIG. 9A illustrates an example task database. Security related tasks can include scanning the data store of a newly-joined device on the team, or a file on one of the devices of the team, providing a secure Internet connection (e.g., one of the team devices operating as a proxy server for one or more other team devices), and the like. In the embodiment shown, each task is associated with a priority level, a measure of the complexity of the task (e.g., in terms of required computational resources, or time using particular resources, to complete the task).

In one embodiment, the task coordinating module of each device on the security sharing team maintains a copy of the task database, and a process of synchronization is used to keep each device's copy current. In another embodiment, the task database is distributed such that different parts of the task database are maintained at different devices. Other embodiments are also contemplated that are a combination of those two approaches, in which parts of the task database are duplicated at different devices, whereas other parts are not duplicated. In still other embodiments, the team centrally maintains a task database at a specific device, or at a specific sub-group of devices. In embodiments where multiple devices maintain copies of at least a portion of the task database, updating of the task database can be a periodic operation (e.g., at specified intervals), or on-demand (e.g., when a security-related task to be performed is added to the database, and each team member device is sent a notice to update its local database copy).

In one embodiment, a user is permitted to add security-related tasks onto his or her device, and to specify that task's status, i.e., its priority, task type, time of its execution, etc. Status can also be determined automatically based on the criticality of the task. For example, providing a secure connection to the Internet, or checking email in the immediate future can be regarded as a high priority, whereas a planned scan, which may be performed during the course of the day, can be regarded as a low priority task. In a related embodiment, each task in the database is associated with its own timer which measures how long the task has been in the list of tasks and, for tasks that have been pending for a long time, their priorities can be raised. This mechanism can prevent lower priority tasks to be postponed indefinitely.

In addition to the priority for each task, the load level (i.e., computational burden) associated with each task is also maintained in certain embodiments. The load level can be predetermined on the basis of expert assessments for a variety of tasks. For instance, full scanning of a new device requires a large amount of resources (high computational burden), while scanning a small number of files on the device, e.g., Jerry's MID shown in FIG. 9A would take relatively little time and few resources (since hashing or timestamp techniques can be used to verify if files have not changed-making scanning unnecessary for a majority of files on the device).

In one embodiment, the security sharing team members operate cooperatively to distribute security-related process assignments in a manner that distributes relatively greater shares of the overall processing load to devices having greater capability. Capability in this sense can mean computing capacity availability as described above, such that, for example, more capable devices are those that have relatively more powerful processors, more memory, more communication bandwidth, more battery life remaining, or any combination of these parameters.

In one embodiment, a user is permitted to add security-related tasks onto his or her device, and to specify that task's status, i.e., its priority, task type, time of its execution, etc. Status can also be determined automatically based on the criticality of the task. For example, providing a secure connection to the Internet, or checking email in the immediate future can be regarded as a high priority, whereas a planned scan, which may be performed during the course of the day, can be regarded as a low priority task. In a related embodiment, each task in the database is associated with its own timer which measures how long the task has been in the list of tasks and, for tasks that have been pending for a long time, their priorities can be raised. This mechanism can prevent lower priority tasks to be postponed indefinitely.

Figure 10A:
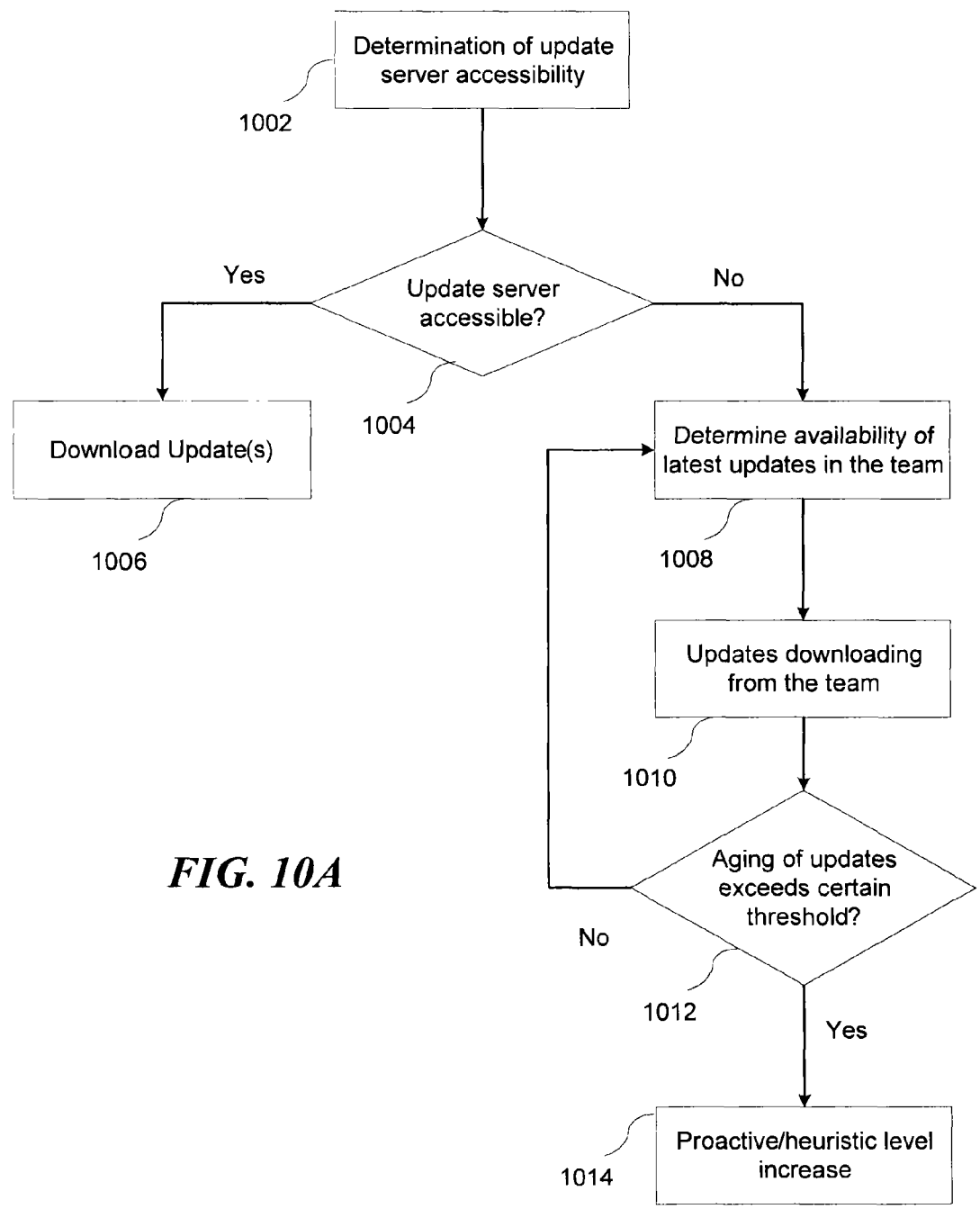
FIG. 10A is a flow diagram illustrating a process by which the security sharing team helps devices obtain security updates according to one embodiment.

In addition to the priority for each task, the load level (i.e., computational burden) associated with each task is also maintained in certain embodiments. The load level can be predetermined on the basis of expert assessments for a variety of tasks. For instance, full scanning of a new device requires a large amount of resources (high computational burden), while scanning a small number of files on the device, e.g., Jerry's MID shown in FIG. 10A would take relatively little time and few resources (since hashing techniques can be used to verify if files have not changed-making scanning unnecessary for a majority of files on the device).

In one embodiment, the load level associated with a security task is expressed in terms of computing capacity needed in a device to carry out the task. In a related embodiment, the load level is classified, or associated with, a range of computing capacity. For example, as illustrated in FIG. 9B, the load level is classified as low, medium or high, with each class corresponding to a range of computing capacity of the device, and a measure of availability of that computing capacity. In one example embodiment, the measure of availability is expressed in terms of processor idle time percentage.

As discussed above, in cases where PID 10 is a more highly capable device than another device of the security sharing team, PID 10 can take on numerous security functions of one or more other devices; however, doing so would tend to reduce the available computing capacity of PID 10 to perform other functions. Indeed, the use of PID 10 to execute user applications and other non-security operations reduces the available computing capacity for security tasks. In one embodiment, the measure of availability, expressed as a number from 0 to 1, can be used to determine the computing capacity available at any given moment with Formula (1) as follows:

$$[\text{Available computing capacity}] = [\text{computing capacity}] * [\text{measure of availability}] \quad (1)$$

In a related embodiment, the selection of the device to which to delegate security tasks is based on the available security modules present on that device. For instance, a device having a local copy of a malware database may be able to check another device's files for malware with greater efficiency that a device that needs to read a malware database located remotely. In another example, the specific security task to be delegated is compared against a list of resources associated with performing that task and, of the available devices on the security sharing team, the device with the best match in terms of available security modules and computing capacity, is preferentially selected.

In one embodiment, PID 10 includes a user interface that allows the user to configure task coordinating module 408, or configuration modules 410 or 450 to permit or deny, or limit, the use of PID 10 to perform security tasks for other devices. As an example, the user setting can operate to set a maximum limit for the measure of availability that can be indicated for PID 10, thereby reserving computing capacity for local processes of PID 10. In variations of this embodiment, the user interface facilitates specifying rules, or decision logic, by which the device makes itself more available or less available to take on security-related processing for other devices. For example, a user wishing to preserve the battery life on his or her device may specify that security tasks for other devices will not be performed if the battery life is below some set amount, e.g., 50%. Likewise, the user may specify that PID 10 will preferentially seek to distribute security-related tasks to the team, rather than performing those tasks locally in the event that the remaining battery life is below some amount, e.g., 30%.

Figure 9C:
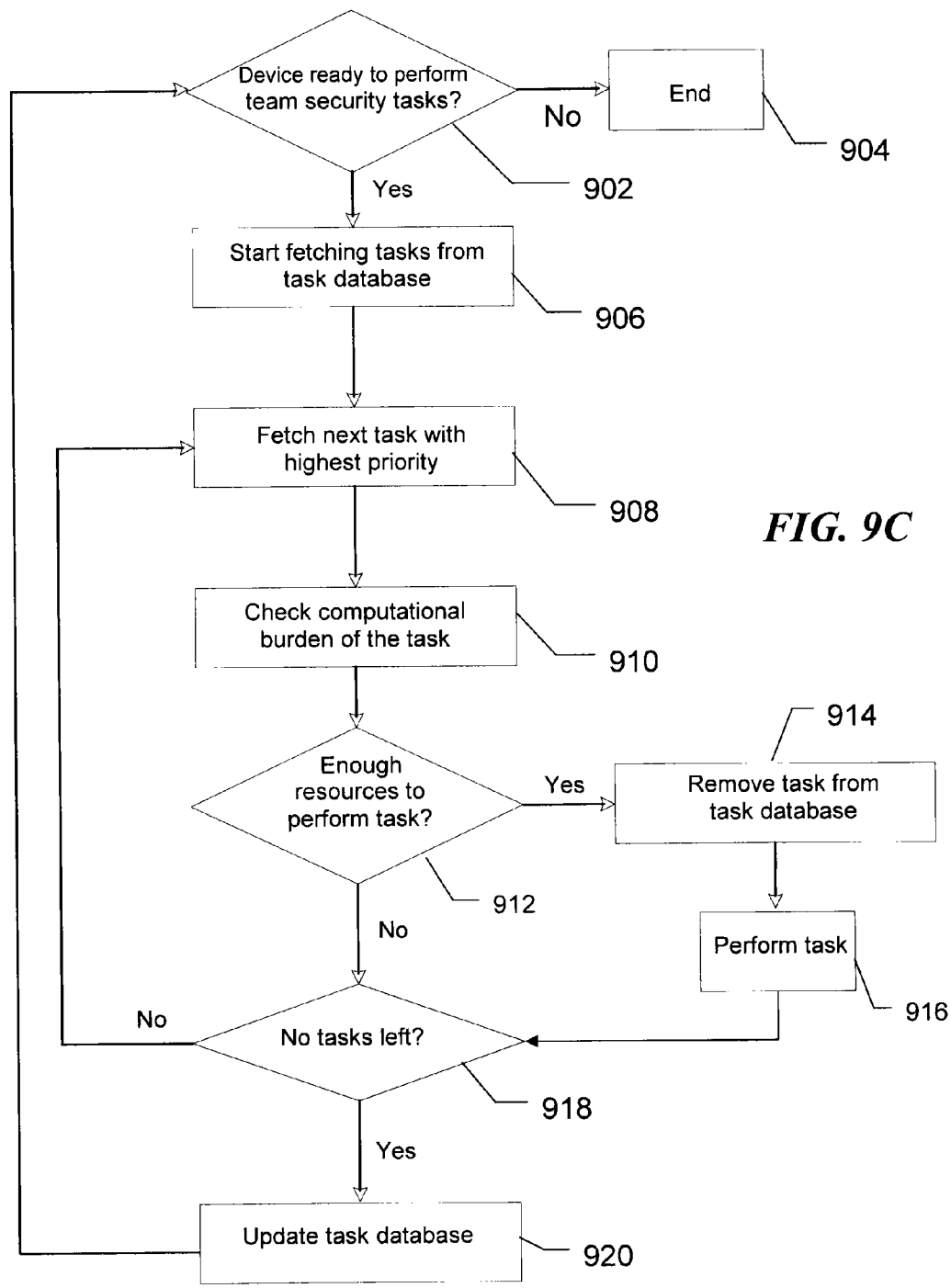
FIG. 9C is a flow diagram illustrating a process by which a portable information device interacts with the task database of FIG. 9A to select tasks to perform according to one embodiment.

FIG. 9C is a flow diagram illustrating a process by which PID 10 interacts with the task database to select tasks to perform according to one embodiment. First, at 902, PID 10 checks whether it is ready to perform security tasks. In the event that the device is configured by the user to not perform security-related tasks for other devices, the process ends at 904. Otherwise, at 906 the process causes PID 10 to start retrieving tasks from the task database. At 908, the task with the highest priority level is selected. At 910, PID 10 looks up the computational load associated with that task and, at 912, compares that load to the its currently available computing capacity. If PID 10 has the capacity to execute the task, the task is removed from the task database at 914 (so that other devices do not take on the processing of that task in the mean time) and, at 916, PID 10 executes the task.

Following execution, or if PID 10 does not have the computing capacity available to execute that selected highest-priority task, PID 10 checks, at 918, whether there may be other tasks in the task database that need to be processed. If there are tasks remaining, the process branches to 908 to retrieve the task having the next-highest priority (which may be less burdensome than the previous task). This process continues until there are no tasks remaining in the task database. At 920, PID 10 updates the task database (or its local copy of the task database, if applicable). The process of FIG. 9C permits various types of portable devices on the security sharing team to participate in taking on security tasks, not only the most powerful devices.

In the process depicted in FIG. 9C, tasks are selected first by their priority, then by the complexity of their execution. As an example, consider the situation where a user of PID 10 wants to check some recently-received files on his device, but PID 10 has only a minimal set of security functionality, necessitating the assistance of the team. In this case, the files to be checked or, in some embodiments the hashes or checksums of those files, are transferred to PID 802a, which has more computing capacity availability and functionality, such as the function of maintaining a database of malicious programs. However, checking files for malware in this example has not been given high priority by the user of PID 10, and since device 802a is one of the more powerful devices in the team, device 802a is delegated other, higher priority, security tasks, such as providing web browsing security for the user of device 802b. Once the web browsing security task is completed for device 802b (i.e., the user of device 802b completes the web browsing activity), the lower-priority task for PID 10 may be attended to. The mechanism of managing prioritization may include increasing the priority level of tasks based on the length of time that those tasks have been pending. In a related embodiment, PID 10 may provide a user interface that lists pending security-related tasks in a form that is understandable to the user, and provides controls that permit the user to manually increase the priority level of the selected security task. In another related embodiment, device 802a to which security tasks are delegated in this example may include a user interface that allows the task database priority level to be controlled by a user of device 802a who is trusted by the team member devices delegating the tasks.

This example demonstrates a task prioritization mechanism for the security sharing team where the highest-priority tasks, that is, tasks which can no longer wait, are given preferential treatment to being delegated to higher-power devices over lower-priority tasks, even if the lower priority tasks are computationally more expensive. This type of approach is generally well-suited for real-time security needs of user groups because utilizing available processing capacity to satisfying urgent needs is seen from the users' perspective as providing better overall servicing of the security needs. Lower priority, but more computationally expensive tasks are processed eventually, also by other devices of the security sharing team if needed, in order complete those tasks at a level of service commensurate with the reduced urgency of those tasks.

In a related embodiment, PID 10, or at least one other device on the security sharing team, maintain a set of associations between security-related functions or tasks, and their computational expense. These associations, which may be stored as a list, a set or database records, or in any other suitable format, are used with the list of security sharing team member devices and their individual capabilities, to determine whether an identified process is suitable for distribution, and if so, to which device(s) it should be distributed. In one embodiment, using these data structures, PID 10 determines how to distribute processes that operate for the benefit of PID 10. In another embodiment, a different security sharing team member device, such as a team master, for example, makes that determination using information collected from each of the other team member devices that wish to distribute processing.

In another related embodiment, each task is associated with one or more measures relating to the importance or sensitivity of the task such as, for example, system criticality, information sensitivity, time-sensitivity, and the like. These measures are then used to determine which security sharing team member devices, based on their trust classification in addition to their ability to perform the processing, are preferred devices to which the process can be distributed.

Figure 9D:
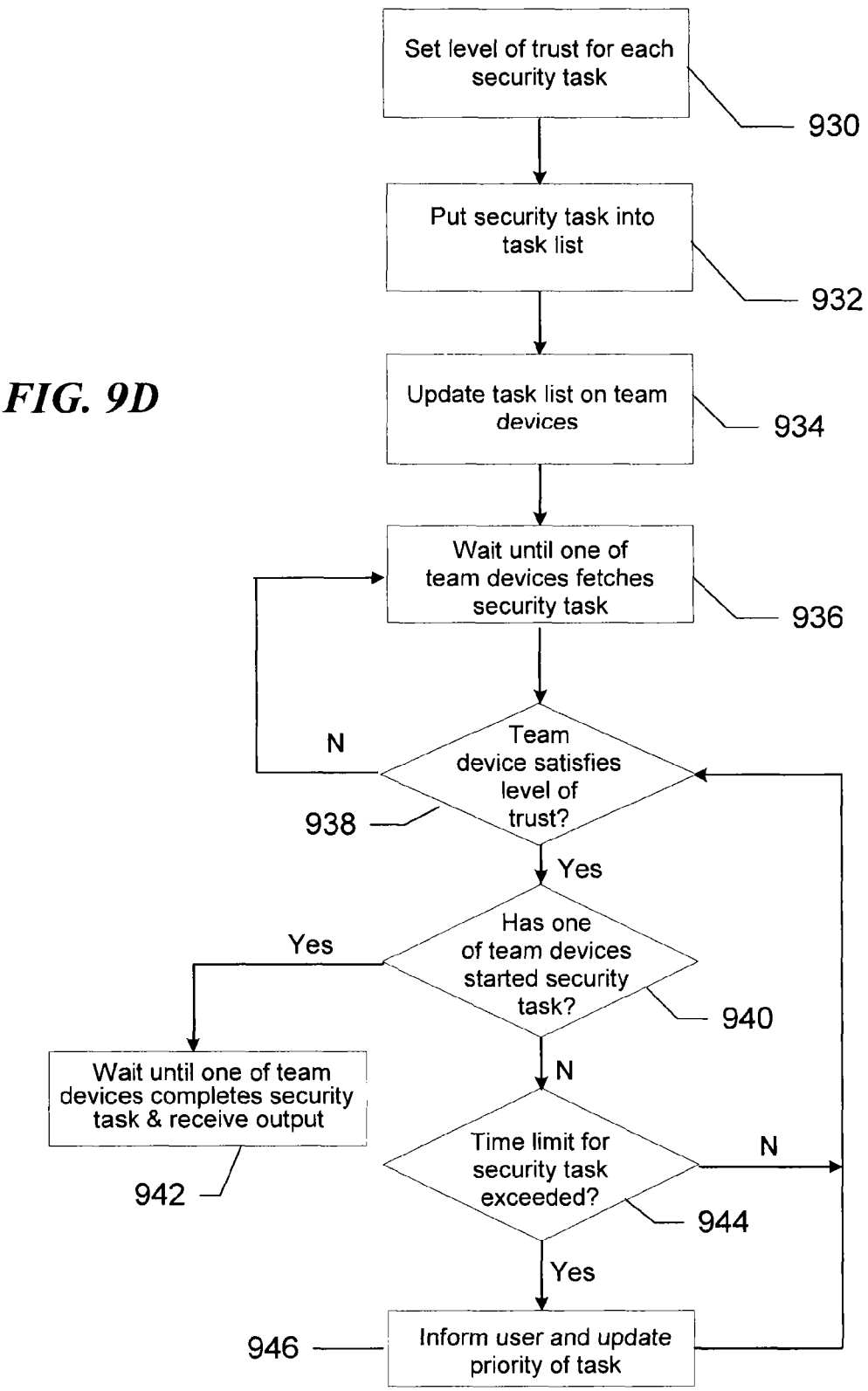
FIG. 9D is a flow diagram illustrating a process for distributing security-related tasks taking into account the trust level associated with the different team devices and the level of protection needed for the task to be distributed, according to one embodiment.

In one example, as illustrated in FIG. 9D, a process for distributing security-related tasks can take into account the trust level (such as the trust classification described above with reference to FIG. 8B). The principle implemented in this process is that, in situations where the security task requires a high degree of protection, or where one cannot be sure that the device to which the security-related task is being distributed is itself free from malware or otherwise uncompromised, then it would be inappropriate to delegate the task in such situations. In a related embodiment, the delegating device provides a user interface that permits the user to designate particular team devices that are trusted for certain tasks but not others. For instance a colleague's device might be trusted to share security updates, but not for screening web browsing traffic.

Turning now to FIG. 9D, the process begins at 930 with setting the level of trust required for selected security tasks. In a related example, security tasks may be grouped into trust classes with other security tasks having similar security sensitivity, such that the trust level may be specified for each class. At 932, the security task to be distributed to the team is placed into the task list. At 934, task lists stored remotely at various devices are updated in similar fashion as described above with reference to FIG. 8F. At 936, the delegating device waits until one of its team members fetches the security task to be processed. At this stage, the device accepting the security task identifies itself (there may be an authentication step to ensure that the device is the one that it purports to be). At 938, the delegating device determines if the accepting device can be trusted with the particular task. This, of course, depends on the level of trust of the accepting device, and the task (or class of tasks the task belongs to). If the accepting device has insufficient trustworthiness, the process branches back to 936 to allow a different device to accept the task for processing. If the accepting device is trusted to perform the security task, at 940, the delegating device checks if the accepting device has started the processing of the task. If so, the delegating device awaits completion of the task at 942, and receives the output of the processing. Otherwise, the delegating device checks at 944 if the time limit for accepting the task has been exceeded. If it has not, the process branches back to 938 as illustrated. Otherwise, in the event that the delegation attempt times out, the user is notified and the task priority may be increased at 946.

FIGS. 10A-10E are process flow diagrams that illustrate exemplary processes by which the security sharing team of devices can be utilized to efficiently perform various security-related functions. The process illustrated in FIG. 10A utilizes the security sharing team to help devices obtain security updates. Regular updates are essential for effective use of security software, since new malware threats are constantly being developed and deployed. Accordingly, security firms may provide updates at hourly intervals, or even more frequently if necessary. When a portable information device does not have access to a server that can provide updates, that device's security module becomes increasingly ineffective. Accordingly, at 1002, configurable security module 400 of PID 10 determines whether it has connectivity to a security server that provides updates. The server may be inaccessible in the event that the local area network in which PID 10 is operating has lost its wide-area network connectivity. Still, PID 10 may be exposed to risks on the local network, especially if that network is open to the public. There are, of course, myriad other situations where PID 10 is unable to receive updates.

If the decision at 1004 indicates that updates can be obtained from the security server, the problem is obviated, and updates are downloaded at 1006 in due course. If, however, PID 10 determines that updates cannot be obtained from the security server in usual fashion, the latest update that has been received by any member of the security sharing team is determined at 1008. In one such embodiment, each device on the team is interrogated in turn to assess its update version or the time when the last update was initiated or completed. In another embodiment, the security sharing team continuously maintains a list or database that represents, among other things, the update status of each team member. The list or database may be maintained centrally on a designated team member device, or may be maintained by each individual team member device. At 1010, PID 10 downloads the latest security update from the team member device that has the latest update and is able to share it with PID 10.

That latest update may still be deemed too old, in which case the security sharing team's security may be compromised. Accordingly, at 1012, PID 10 determines if the latest update present on any team member is stale. This can be accomplished in various ways, such as, for example, by comparing the time of that update with the present time and, if the difference exceeds a predetermined threshold, the update situation is deemed obsolete. In this case, at 1014, configurable security module 400 is configured to operate more aggressively. For instance, an intrusion prevention system (IPS) can be enabled, or the settings of the firewall can be adjusted to screen and filter incoming communications more aggressively. Thus, configurable security module 400 can be set to operate more proactively, or to enable or increase heuristic functionality.

Figure 10B:
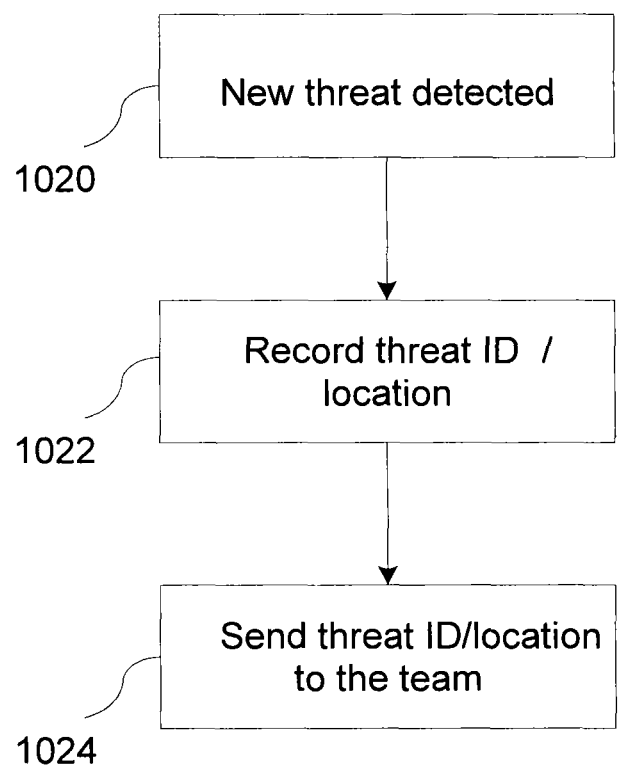
FIG. 10B illustrates an example process in which the collective intelligence of the security sharing team member devices is utilized to improve the effectiveness of each individual device's security according to one embodiment.

FIG. 10B illustrates an example process in which the collective intelligence of the security sharing team member devices is utilized to improve the effectiveness of each individual device's security. Upon the detection of any threat by any device on the security sharing team at 1020, the identification or location of that threat is recorded locally by that device at 1022, and distributed to the other member devices of the team at 1024. Upon receipt of that threat identification or location, the receiving team member devices can take immediate action to target that particular threat, such as scanning for a presence of that particular threat, immunizing against that particular threat, or configuring a local firewall or intrusion detection/prevention system to recognize or block communications with, or access to, the particular threat.

In this example, a threat can constitute a presence of malware, an intrusion over the network, a dangerous website or dangerous email content (such a phishing attack), or any other data or event that is deemed a security threat by the device (such as PID 10) that discovers the threat. The ID or location of that threat can be a descriptor of the threat. In one embodiment, the ID includes a hash of a piece of malware or email, whereas the location includes a URL or IP address of a website deemed to be a security threat.

The detection of the threat can be achieved by a variety of security operations such as, for example, by operation of a malware scan, or by emulation of a program in a sandbox (both of which are computationally expensive processes). Thus, the process illustrated in FIG. 10B permits team member devices that have less robust security functionality (such as, for example, devices that have less computing capacity), to benefit from the increased security of devices that have more robust security functionality.

It should be noted that embodiments utilizing the process of FIG. 10B do not directly distribute security functionality by assigning specific tasks to other devices (as may be the case in other embodiments described herein). Instead, the process of FIG. 10B permits the benefit of certain security functionality to be distributed by sharing results of those computationally expensive security operations. In practice, team member devices that have similar risk profiles and are operating on the same network are at an increased likelihood of encountering the same threat that another team member device encounters. Distributing the result of a completed security-related process permits the other team members to benefit from that process without having to actually run the process.

Figure 10C:
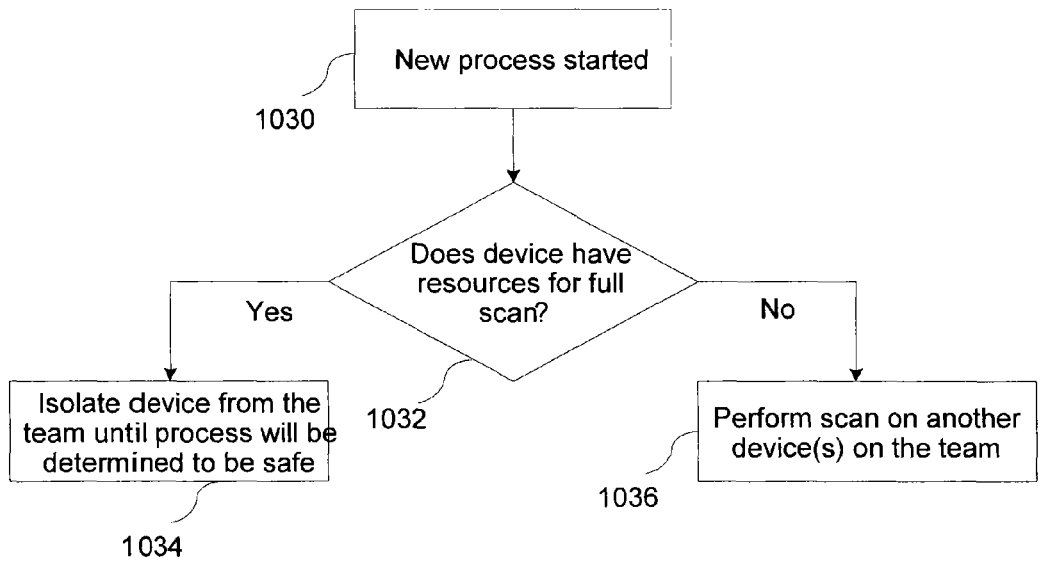
FIGS. 10C and 10D illustrate processes according to embodiments in which security functions or tasks are distributed by the PID to other members of the security sharing team.
Figure 10D:
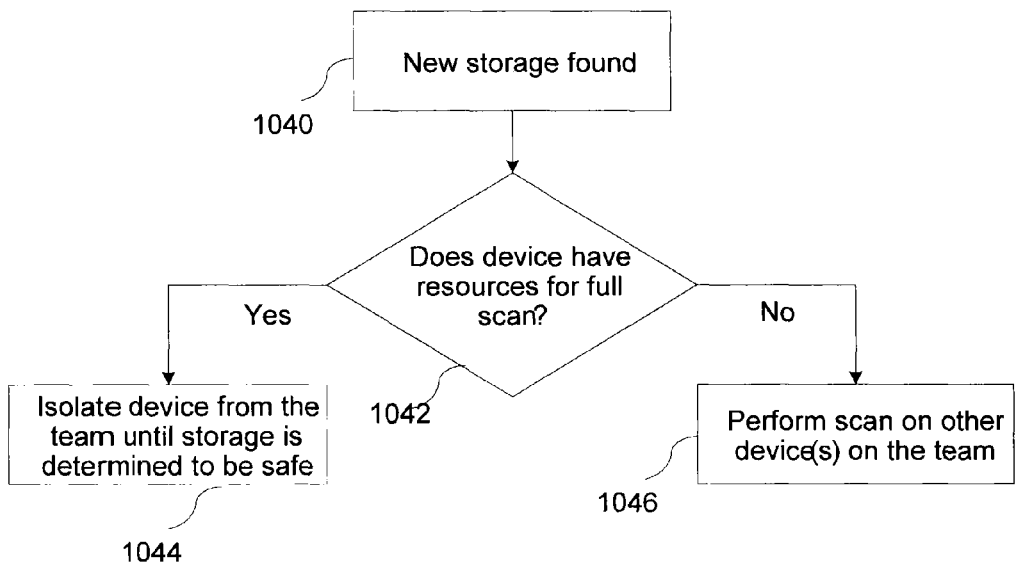

FIGS. 10C and 10D illustrate processes according to embodiments in which security functions or tasks are distributed by PID 10 to other members of the security sharing team. Referring to FIG. 10C, when a new (no previously screened) program is executed and a process of that program is started in PID 10 at 1030, configurable security module 400 intercepts the process and determines at decision 1032 whether there is sufficient computing capacity in PID 10 to perform a full scan, or other type of evaluation of that new process. A scan may entail comparing the instructions of the process against a database of known malware or other threats; whereas other types of evaluation include running the process in a protected sandbox to determine if the process attempts to perform any suspicious activities, such as accessing memory space allocated to the kernel of the operating system, for example. The extent of security screening may be determined by PID 10 based on the current risk profile. This type of scan or evaluation is computationally expensive, and PID 10 may or may not have sufficient computing capacity to carry out the security process.

In the case where there is sufficient computing capacity, PID 10 is isolated from the rest of the security sharing team at 1034 while configurable security module 400 performs the security screening process. In a related embodiment, the isolation of PID 10 is lifted in response to the process being screened is either identified as being safe, or is scrubbed or shut down, rendering PID 10 safe. In the case where decision 1032 determines that PID 10 does not have sufficient computing capacity to perform the scanning or evaluation, screening process is tasked to one or more devices that are team members and that are capable and authorized to perform that processing, and the screening is thus performed on another at least one device, at 1036.

Referring now to FIG. 10D, another embodiment is described in which similar steps are taken in response to a recognition by PID 10 that a new storage device is attached. This process can be started when a removable memory card is inserted into PID 10, for example. The new memory card may have data or programs that can have security threats, and must be scanned before its contents can be accessed safely. At 1040, PID 10 recognizes the new storage device. The decision at 1042 determines, as previously described in the process of FIG. 10C, whether PID 10 has sufficient computing capacity to perform the scan. If PID 10 has sufficient capacity, it is isolated from the security sharing team at 1044 while the scanning is performed locally in PID 10. Otherwise, the scan is performed by one or more other team member devices at 1046.

Figure 10E:
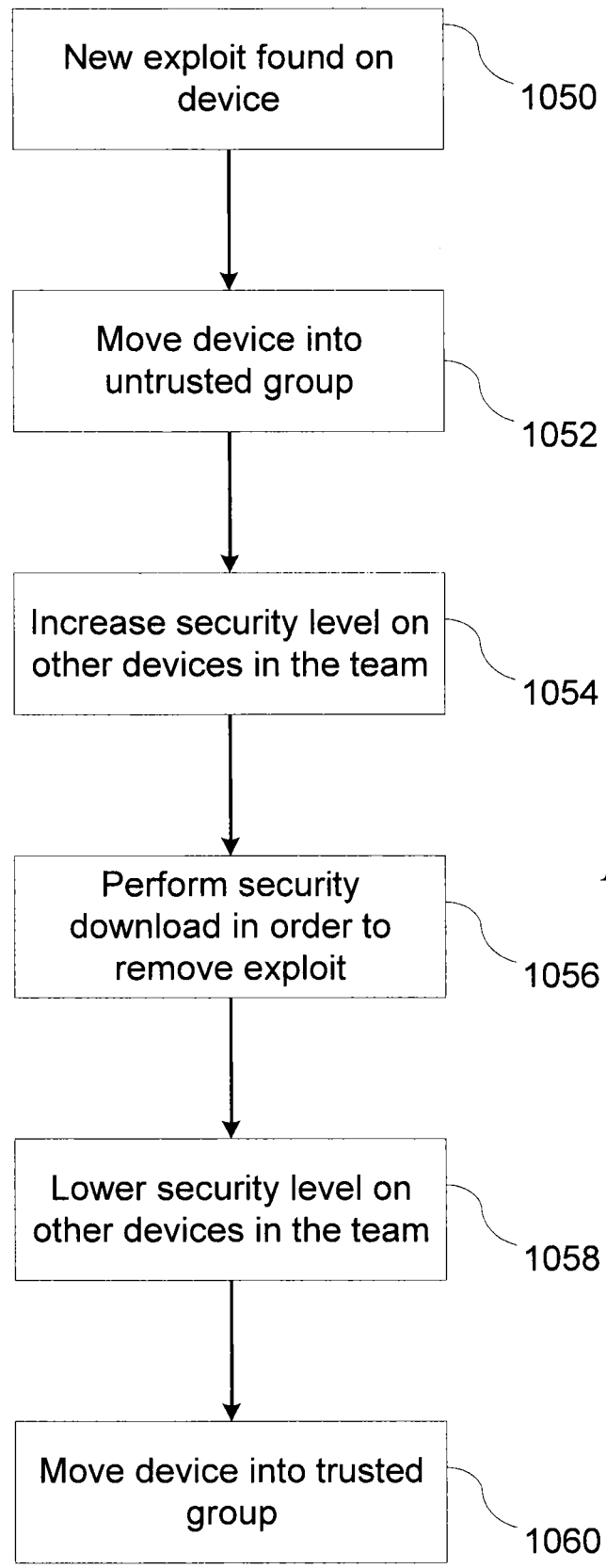
FIG. 10E illustrates a process according to one embodiment that is performed collectively by operation of the devices on a distributed security processing security sharing team, in which individual devices share information about their discovered security vulnerabilities so that other team members can take protective actions.

FIG. 10E illustrates a process according to one embodiment that is performed collectively by operation of the devices on a distributed security processing security sharing team, in which individual devices share information about their discovered security vulnerabilities so that other team members can take protective actions. At 1050, device A recognizes a vulnerability or exploit, such as, for instance, that a worm has breached its local security, or simply that malware definitions have been updated but that the local scan or immunization using those definitions has not been performed (the result being an identification of a potential weakness in the security). In response, device A informs the rest of the security sharing team of its compromised security state. Once that information is received, each of the other devices at 1052 adjusts its list or database of team member devices such that device A is identified as being un-trusted. Depending on the severity of the vulnerability or exploit identified, the security sharing team devices adjust their risk profile or otherwise take action at 1054 to increase their security level to protect themselves more aggressively.

At 1056, steps are taken by device A and the other devices on the security sharing team to resolve the vulnerability or exploit. Once complete, the devices on the security sharing team exchange status updates and, when it is determined that the devices of the security sharing team are protected against the identified vulnerability or exploit, the security level can be reduced at 1058, and device A can be returned to being a fully-participating member of the security sharing team at 1060.

Aspects of the invention contemplate that there are a virtually unlimited number of suitable approaches that can be implemented in the decision criteria of configuration determining module 460 to configure security module 400 based on the different inputs. Moreover, the there are many variants of types of configurations of security module 400 that could be achieved. Accordingly, the invention should not be limited beyond the limitations set forth in the claims below, to any particular illustrative example described herein.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the spirit and scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A portable information device including a user interface device adapted to originate and consume information on behalf of a user, the device having a security arrangement adapted for team-assisted security functionality, the device comprising:

computer circuitry, including a processor operatively coupled to a data store;

a user interface, including display and user input devices;

wireless communications circuitry; and a power supply that provides power to the computer circuitry, user interface, and wireless communications circuitry, the power supply including an on-board energy source;

wherein the computer circuitry includes a security module adapted to provide team-assisted security services in the portable information device, the security module including:

a thick client security portion adapted to locally process security-related tasks on the computer circuitry;

a security team connection module adapted to facilitate local wireless connectivity via the wireless communication circuitry between the portable information device and a security module of at least one other portable information device; and a security task coordinator module adapted to locally decide, exclusive of the security team connection module, which of the security-related tasks is to be processed remotely by the security team in lieu of being processed locally on the portable information device using the computer circuitry, by at least determining, by a local analysis executed by the security task coordinator module, an indication of security priority for the portable information device;

wherein the security module is adapted to conduct an exchange of security-related information between the thick client security portion and the at least one other portable information device via the security team connection module; and wherein the security module is configured to process, via the thick client security portion, a first security task of the security-related tasks on the computer circuitry to produce a first security task output, and to transmit, via the security team connection module, the first security task output to at least one portable information device of the security team.

2. The portable information device of claim 1, wherein the first security task is processed in response to a remotely-generated request by at least one portable information device of the security team.

3. The portable information device of claim 1, wherein the first security task is processed in response to a locally-decided need by the security module.

4. The portable information device of claim 1, wherein the first security task includes at least one security function selected from the group consisting of: a scan of a data object for a presence of malware, a security update, an identification of a security risk, and an intrusion detection function.

5. The portable information device of claim 1, wherein the security team connection module is adapted to participate in an ad hoc wireless network with the a plurality of other portable information devices of the security team.

6. The portable information device of claim 1, wherein the security module further includes a computing capacity determining module adapted to dynamically re-assess current computing capacity availability relating to usage and performance expectations for operation of the portable information device; and wherein the security module is adapted to transmit the first security task output based on the current computing capacity availability re-assessed by the computing capacity determining module.

7. The portable information device of claim 1, wherein the thick client security portion is adapted to respond to a receipt of security-related information from the security team via the security team connection module by increasing a level of security protection being provided for the benefit of the portable information device.

8. In a portable information device (PID) including a user interface device adapted to originate and consume information on behalf of a user, and having a dynamically self-configuring security module, a method for distributing security-related processing to a team of at least one other portable information device communicatively coupled to the PID, the method comprising:

maintaining, by the PID, a list of the at least one other portable information device that is authorized to process security-related tasks for the benefit of the PID, the at least one other portable information device also including a user interface device adapted to originate and consume information on behalf of a user;

locally deciding, by the PID, and exclusive of the team, whether to distribute a security-related task to be processed by a device of the team that is different than the PID in lieu of being processed locally by the PID, wherein the deciding is based on a characteristic of the task and on current available computing capacity of the PID, wherein the characteristic of the task is at least an indication of security priority for the portable information device;

in response to a decision to distribute the security-related task, posting, by the PID, the task to a task list that is accessible to devices of the team; and receiving, by the PID, an output generated by at least one device of the team in response to a completion of processing of the task.

9. The method of claim 8, wherein maintaining the list of the at least one other portable information device that is authorized to process security-related tasks for the benefit of the PID includes maintaining dynamic information relating to each device, the dynamic information including at least one parameter selected from the group consisting of: risk profile information, current computing capacity information, trust level information, location information, or any combination thereof.

10. The method of claim 8, wherein maintaining the list of the at least one other portable information device that is authorized to process security-related tasks for the benefit of the PID further includes identifying devices in the list that are portable infrastructure devices.

11. The method of claim 8, wherein posting the task to the task list includes associating the task with a priority level.

12. The method of claim 8, wherein posting the task to the task list includes associating the task with a computational load.

13. The method of claim 8, wherein locally deciding whether to distribute a security-related task includes determining whether a device of the team satisfies trust requirements corresponding to a sensitivity of the task.

14. The method of claim 8, further comprising:
in response to a task having been posted to the task list for a predetermined time limit, adjusting a priority level associated with the task.

15. The method of claim 8, further comprising:
analyzing, by the PID, whether to process a task posted to the task list by another device of the team for the benefit of that other device, wherein the analyzing includes checking a current computing capacity availability of the PID and a load level associated with the task posted by the other device of the team.

16. The method of claim 8, further comprising:
analyzing, by the PID, whether to process a task posted to the task list by another device of the team for the benefit of that other device, wherein the analyzing includes checking whether security resources available on the PID are suitable for processing the task posted by the other device of the team.

17. The method of claim 8, further comprising:
in response to receiving a security update by the PID, sharing, by the PID, the security update with at least one other device of the team.

* * * * *